United States Patent
Givehchian et al.

(10) Patent No.: US 11,885,899 B2
(45) Date of Patent: Jan. 30, 2024

(54) GENERATING INDOOR MAPS BASED ON RADIO FREQUENCY SENSING

(71) Applicant: QUALCOMM Incorporated, San Diego, CA (US)

(72) Inventors: Hadi Givehchian, La Jolla, CA (US); Xiaoxin Zhang, Sunnyvale, CA (US); Peyman Siyari, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/315,128

(22) Filed: May 7, 2021

(65) Prior Publication Data

US 2022/0357419 A1    Nov. 10, 2022

(51) Int. Cl.
*G01S 5/02* (2010.01)
*H04W 4/029* (2018.01)

(52) U.S. Cl.
CPC ...... *G01S 5/02526* (2020.05); *G01S 5/02527* (2020.05); *H04W 4/029* (2018.02)

(58) Field of Classification Search
CPC .................................................... H04W 4/029
USPC ...................................................... 455/456.1
See application file for complete search history.

(56) References Cited

U.S. PATENT DOCUMENTS

| | | |
|---|---|---|
| 10,361,887 B2 | 7/2019 | Bhatti et al. |
| 2019/0020530 A1* | 1/2019 | Au .................. H04W 72/21 |
| 2020/0018814 A1 | 1/2020 | Perez-Ramirez et al. |
| 2021/0241173 A1* | 8/2021 | Li ......................... G06N 3/048 |
| 2022/0066018 A1* | 3/2022 | Han ....................... G01S 7/006 |

FOREIGN PATENT DOCUMENTS

| | | | |
|---|---|---|---|
| CN | 107015196 B | | 9/2019 |
| CN | 110809240 | * | 11/2019 |
| CN | 111182459 A | | 5/2020 |
| CN | 111479231 A | | 7/2020 |
| EP | 3483621 A1 | | 5/2019 |

(Continued)

OTHER PUBLICATIONS

English translation CN110809240 (Year: 2019).*

(Continued)

*Primary Examiner* — Ted M Wang
(74) *Attorney, Agent, or Firm* — QUALCOMM Incorporated

(57) ABSTRACT

Methods and systems for generating map information of an environment using channel state information (CSI) of wireless signals received by access points (APs) in the environment are disclosed. In some implementations, a system uses CSI of a wireless signal received by a respective AP to determine a time-of-flight (ToF) and an angle-of-arrival (AoA) of one or more reflected path signal components of the wireless signal, and estimates the locations of points or surfaces in an area of the respective AP based on the ToF and AoA of the reflected path signal components. The estimated locations of the points or surfaces can be used to generate map information for the area. The system aggregates map information generated for different areas of the environment to determine map information for the entire environment. The wireless signals may be received from wireless stations or user equipment, or may be received from the respective AP.

30 Claims, 15 Drawing Sheets

(56) References Cited

FOREIGN PATENT DOCUMENTS

TW          202014040        *  9/2018
WO     2018160141  A1     9/2018

OTHER PUBLICATIONS

English translation TW 202014040 (Year: 2018).*
Ahmed, A.U., et al., "Estimating Angle-of-Arrival and Time-of-Flight for Multipath Components Using WiFi Channel State Information", Sensors (Basel, Switzerland), May 29, 2018 (May 29, 2018), XP055862408, pp. 1-18, p. 1753, Switzerland DOI: 10.3390/s18061753 Retrieved from the Internet: URL: https://www.ncbi.nlm.nih.gov/pmc/articles/PMC6021904/pdf/sensors-18-01753.pdf [retrieved on Nov. 17, 2021] Abstract, Figure 2.
International Search Report and Written Opinion—PCT/US2022/021902—ISA/EPO—dated Jun. 15, 2022.

\* cited by examiner

GENERATING INDOOR MAPS BASED ON RADIO FREQUENCY SENSING

TECHNICAL FIELD

This disclosure relates generally to wireless communications, and more specifically, to generating map information of an environment using wireless signals.

DESCRIPTION OF THE RELATED TECHNOLOGY

Wireless communications systems provide various types of communications, content, and services to people around the globe. These systems, which can support communications with multiple users by sharing the time, frequency, and spatial resources of a wireless medium, may include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). These multiple access technologies have been adopted in various telecommunication standards to provide a common protocol that enables different wireless devices to communicate on a global level.

One example wireless communications standard is 5G NR, which is part of a continuous mobile broadband evolution promulgated by the Third Generation Partnership Project (3GPP) to meet new requirements associated with latency, reliability, security, scalability, and other requirements. Another example wireless communications standard is the IEEE 802.11 family of wireless communications standards, which governs the operation of wireless local area networks (WLANs), more commonly known as Wi-Fi networks.

Radio-frequency (RF) sensing is a technique for sensing objects or movement in an environment based on the transmission and/or reception of RF signals in the environment. For example, a person moving through the environment interferes with RF signals that are transmitted in the environment. A receiver device may detect changes in the received RF signals to determine the speed or direction of the person's movement. The receiver device may also use characteristics of RF signals reflected by walls and other objects in the environment to determine the location of the walls and the other objects.

SUMMARY

The systems, methods, and devices of this disclosure may be used to generate map information of an environment using wireless signals received by one or more wireless access points (APs) or base stations located in or near one or more corresponding areas of the environment. In various implementations, a system disclosed herein can use channel state information (CSI) of wireless signals received by a plurality of APs or base stations located throughout the environment to determine the locations of walls, barriers, and other physical features of corresponding areas of the environment. The determined locations of the walls, barriers, and other physical features of a respective area can be used to generate map information for the respective area. The map information generated for multiple areas of the environment can be aggregated or combined to generate map information for the entire environment. In one implementation, generating the map information of the area of the environment may be further based on the CSI of one or more wireless signals received by another AP associated with the area of the environment.

In some implementations, the system may include one or more transceivers, a memory, and one or more processors. The one or more transceivers may exchange data, control signals, and other information with APs, base stations, and other devices or systems. The memory may be communicatively coupled to the one or more processors and to the one or more transceivers, and may store computer code executable by the one or more processors. In various implementations, the one or more processors may be configured to obtain, from an AP in an area of the environment, the CSI of a plurality of wireless signals. The one or more processors may be configured to determine a time-of-flight (ToF) and an angle-of-arrival (AoA) of one or more reflected path signal components of each wireless signal based on the obtained CSI. The one or more processors may be configured to estimate locations of points on one or more surfaces within the area based on the ToF and AoA of the one or more reflected path signal components of the wireless signals. The one or more processors may be configured to generate map information for the area of the environment based on the estimated locations of the points on the one or more surfaces. In some implementations, generating the map information of the area of the environment may be further based on the CSI of one or more wireless signals received by another AP associated with the area of the environment. In one implementation, generating the map information includes estimating the locations of the points on the one or more surfaces based on the ToF and AoA of different groups of wireless signals received by the AP at different times.

In various implementations, the one or more processors may be configured to determine map information for the entire environment based on an aggregation of the map information generated for the area of the environment and map information generated for one or more other areas of the environment. In some instances, the map information generated for each of the one or more other areas of the environment may be based on the CSI of wireless signals received by one or more other respective APs. In addition, or in the alternative, determining the map information for the environment may be further based on locations of the APs associated with each of the areas of the environment, one or more coverage gaps between the areas of the environment, or any combination thereof.

The ToF of the reflected path signal component of a respective wireless signal may indicate a distance between the AP and a corresponding point, and the AoA of the reflected path signal component of the respective wireless signal may indicate a direction of the corresponding point relative to the AP. In various implementations, the ToF and AoA are determined only for the reflected path signal components having a signal-to-noise ratio (SNR), a signal-to-interference-plus-noise ratio (SINR), a received signal strength indicator (RSSI), a reference signal received power (RSRP), or a reference signal received quality (RSRQ) greater than a value. The wireless signals may include (but are not limited to) measurement frames, null data packets (NDPs), sounding frames, sounding signals, reference signals, probe requests, probe responses, acknowledgement (ACK) frames, action frames, or any combination thereof.

In some implementations, the wireless signals may be received from one or more wireless stations (STAs) or user equipment (UE) within a coverage area of the AP. The one or more processors may be configured to determine a ToF and AoA of a direct path signal component of each wireless signal based on the obtained CSI, and to estimate locations of the one or more STAs or UEs based on the ToF and AoA of the direct path signal components of the wireless signals received from the respective STAs or UEs. The direct path signal component of a respective wireless signal may be the signal component of the respective wireless signal that has the shortest ToF. The one or more processors may be configured to selectively adjust the estimated locations of the points on the one or more surfaces based on the estimated locations of the respective STAs or UEs. In some instances, the wireless signals are transmitted over K tones or frequency subcarriers and are received by N antenna elements of the AP, the ToF and AoA of the direct path signal component of a respective wireless signal is determined concurrently with the ToF and AoA of the one or more reflected path signal components of the respective wireless signal based on a two-dimensional (2D) Fourier transform of the CSI of the respective wireless signal transmitted over the K tones or frequency subcarriers and received by the N antenna elements of the AP, and both K and N are integers greater than 1. In some other instances, the ToF and AoA of the direct path signal components and the ToF and AoA of the one or more reflected path signal components of the wireless signals may be determined based on a machine learning model trained with the CSI of wireless signals received from one or more transmitter devices having known locations.

In various implementations, estimating the location of each point may include determining an image source associated with the point based on the estimated location of a respective STA or UE and the ToF and AoA of a corresponding reflected path signal component of the wireless signal received from the respective STA or UE, determining a first line extending between the AP and the image source, determining a second line extending between the image source and the estimated location of the respective STA or UE, determining a third line that is a perpendicular bisector of the second line, and determining the location of the point as an intersection of the first line and the third line.

In some implementations, the one or more processors may be configured to determine a movement of at least one of the STAs or UEs. The one or more processors may be configured to obtain, from the AP, the CSI of one or more additional wireless signals received from the at least one STA or UE. The one or more processors may be configured to determine the ToF and AoA of the direct path signal component and the ToF and AoA of one or more reflected path signal components of each additional wireless signal based on the CSI of the respective additional wireless signal. The one or more processors may be configured to estimate locations of one or more additional points on the one or more surfaces based on the ToF and AoA of the direct path signal component and the ToF and AoA of the one or more reflected path signal components of the respective additional wireless signals.

In some other implementations, the wireless signals may be transmitted by the AP. In some instances, the wireless signals may be monostatic signals. In one implementation, the one or more processors may be configured to determine an amount of signal leakage associated with the direct path signal components of the wireless signals transmitted by the AP. The one or more processors may be configured to adjust the CSI obtained for the wireless signals transmitted by the AP based on the determined amount of signal leakage.

In various implementations, a method is disclosed. The method may be performed by a system coupled to a plurality of APs or base stations located throughout an environment, and may include obtaining, from an AP in an area of the environment, the CSI of a plurality of wireless signals. The method may include determining a ToF and AoA of one or more reflected path signal components of each wireless signal based on the obtained CSI. The method may include estimating locations of points on one or more surfaces within the area based on the ToF and AoA of the one or more reflected path signal components of the wireless signals. The method may include generating map information for the area of the environment based on the estimated locations of the points on the one or more surfaces. In some implementations, generating the map information of the area of the environment may be further based on the CSI of one or more wireless signals received by another AP associated with the area of the environment. In one implementation, generating the map information includes estimating the locations of the points on the one or more surfaces based on the ToF and AoA of different groups of wireless signals received by the AP at different times.

In various implementations, the method may also include determining map information for the entire environment based on an aggregation of the map information generated for the area of the environment and map information generated for one or more other areas of the environment. In some instances, the map information generated for each of the one or more other areas of the environment may be based on the CSI of wireless signals received by one or more other respective APs. In addition, or in the alternative, determining the map information for the environment may be further based on locations of the APs associated with each of the areas of the environment, one or more coverage gaps between the areas of the environment, or any combination thereof.

The ToF of the reflected path signal component of a respective wireless signal may indicate a distance between the AP and a corresponding point, and the AoA of the reflected path signal component of the respective wireless signal may indicate a direction of the corresponding point relative to the AP. In various implementations, the ToF and AoA are determined only for the reflected path signal components having an SNR, SINR, RSSI, RSRP, or RSRQ greater than a value. In some instances, the wireless signals may include (but are not limited to) measurement frames, NDPs, sounding frames, sounding signals, reference signals, probe requests, probe responses, ACK frames, action frames, or any combination thereof.

In some implementations, the wireless signals may be received from one or more STAs or UEs within a coverage area of the AP. The method may include determining a ToF and AoA of a direct path signal component of each wireless signal based on the obtained CSI, and estimating locations of the one or more STAs or UEs based on the ToF and AoA of the direct path signal components of the wireless signals received from the respective STAs or UEs. The direct path signal component of a respective wireless signal may be the signal component of the respective wireless signal that has the shortest ToF. The method may include selectively adjusting the estimated locations of the points on the one or more surfaces based on the estimated locations of the respective STAs or UEs. In some instances, the wireless signals are transmitted over K tones or frequency subcarriers and are received by N antenna elements of the AP, the ToF and AoA of the direct path signal component of a respective wireless signal is determined concurrently with the ToF and AoA of the one or more reflected path signal components of the respective wireless signal based on a 2D Fourier transform of the CSI of the respective wireless signal transmitted over the K tones or frequency subcarriers and received by the N antenna elements of the AP, and both K and N are integers greater than 1. In some other instances, the ToF and AoA of the direct path signal components and the ToF and AoA of the reflected path signal components of the wireless signals may be determined based on a machine learning model trained with the CSI of wireless signals received from one or more transmitter devices having known locations.

In various implementations, estimating the location of each point may include determining an image source associated with the point based on the estimated location of a respective STA or UE and the ToF and AoA of a corresponding reflected path signal component of the wireless signal received from the respective STA or UE, determining a first line extending between the AP and the image source, determining a second line extending between the image source and the estimated location of the respective STA or UE, determining a third line that is a perpendicular bisector of the second line, and determining the location of the point as an intersection of the first line and the third line.

In some implementations, the method may also include determining a movement of at least one of the STAs or UEs. The method may also include obtaining, from the AP, the CSI of one or more additional wireless signals received from the at least one STA or UE. The method may also include determining the ToF and AoA of the direct path signal component and the ToF and AoA of the reflected path signal components of each additional wireless signal based on the CSI of the respective additional wireless signal. The method may also include estimating locations of one or more additional points on the one or more surfaces based on the ToF and AoA of the direct path signal component and the ToF and AoA of the one or more reflected path signal components of each of the additional wireless signals.

In some other implementations, the wireless signals may be transmitted by the AP. In some instances, the wireless signals may be monostatic signals. In one implementation, the method may also include determining an amount of signal leakage associated with the direct path signal components of the wireless signals transmitted by the AP. The method may also include adjusting the CSI obtained for the wireless signals transmitted by the AP based on the determined amount of signal leakage.

In various implementations, a system is disclosed. The system may include means for obtaining, from an AP in an area of the environment, the CSI of a plurality of wireless signals. The system may include means for determining a ToF and AoA of one or more reflected path signal components of each wireless signal based on the obtained CSI. The system may include means for estimating locations of points on one or more surfaces within the area based on the ToF and AoA of the one or more reflected path signal components of the wireless signals. The system may include means for generating map information for the area of the environment based on the estimated locations of the points on the one or more surfaces. In some implementations, generating the map information of the area of the environment may be further based on the CSI of one or more wireless signals received by another AP associated with the area of the environment. In one implementation, generating the map information includes estimating the locations of the points on the one or more surfaces based on the ToF and AoA of different groups of wireless signals received by the AP at different times.

In various implementations, the one or more processors may be configured to determine map information for the entire environment based on an aggregation of the map information generated for the area of the environment and map information generated for one or more other areas of the environment. In some instances, the map information generated for each of the one or more other areas of the environment may be based on the CSI of wireless signals received by one or more other respective APs. In addition, or in the alternative, determining the map information for the environment may be further based on locations of the APs associated with each of the areas of the environment, one or more coverage gaps between the areas of the environment, or any combination thereof.

The ToF of the reflected path signal component of a respective wireless signal may indicate a distance between the AP and a corresponding point, and the AoA of the reflected path signal component of the respective wireless signal may indicate a direction of the corresponding point relative to the AP. In various implementations, the ToF and AoA are determined only for the reflected path signal components having an SNR, SINR, RSSI, RSRP, or RSRQ greater than a value. In some instances, the wireless signals may include (but are not limited to) measurement frames, NDPs, sounding frames, sounding signals, reference signals, probe requests, probe responses, ACK frames, action frames, or any combination thereof.

In some implementations, the wireless signals may be received from one or more STAs or UEs within a coverage area of the AP. The system may include means for determining a ToF and AoA of a direct path signal component of each wireless signal based on the obtained CSI, and means for estimating locations of the one or more STAs or UEs based on the ToF and AoA of the direct path signal components of the wireless signals received from the respective STAs or UEs. The direct path signal component of a respective wireless signal may be the signal component of the respective wireless signal that has the shortest ToF. The system may include means for selectively adjusting the estimated locations of the points on the one or more surfaces based on the estimated locations of the respective STAs or UEs. In some instances, the wireless signals are transmitted over K tones or frequency subcarriers and are received by N antenna elements of the AP, the ToF and AoA of the direct path signal component of a respective wireless signal is determined concurrently with the ToF and AoA of the one or more reflected path signal components of the respective wireless signal based on a 2D Fourier transform of the CSI of the respective wireless signal transmitted over the K tones or frequency subcarriers and received by the N antenna elements of the AP, and both K and N are integers greater than 1. In some other instances, the ToF and AoA of the direct path signal components and the ToF and AoA of the reflected path signal components of the wireless signals may be determined based on a machine learning model trained with the CSI of wireless signals received from one or more transmitter devices having known locations.

In various implementations, estimating the location of each point may include determining an image source associated with the point based on the estimated location of a respective STA or UE and the ToF and AoA of a corresponding reflected path signal component of the wireless signal received from the respective STA or UE, determining a first line extending between the AP and the image source, determining a second line extending between the image source and the estimated location of the respective STA or UE, determining a third line that is a perpendicular bisector of the second line, and determining the location of the point as an intersection of the first line and the third line.

In some implementations, the system may include means for determining a movement of at least one of the STAs or UEs. The system may include means for obtaining, from the AP, the CSI of one or more additional wireless signals received from the at least one STA or UE. The system may include means for determining the ToF and AoA of the direct path signal component and the ToF and AoA of the reflected path signal components of each additional wireless signal based on the CSI of the respective additional wireless signal. The system may include means for estimating locations of one or more additional points on the one or more surfaces based on the ToF and AoA of the direct path signal component and the ToF and AoA of the one or more reflected path signal components of each of the additional wireless signals.

In some other implementations, the wireless signals may be transmitted by the AP. In some instances, the wireless signals may be monostatic signals. In one implementation, the system may also include means for determining an amount of signal leakage associated with the direct path signal components of the wireless signals transmitted by the AP. The system may also include means for adjusting the CSI obtained for the wireless signals transmitted by the AP based on the determined amount of signal leakage.

In various implementations, a non-transitory computer-readable medium is disclosed. The non-transitory computer-readable medium stores instructions for generating a map of an environment. Execution of the instructions by one or more processors of a system causes the system to perform operations including obtaining, from an AP in an area of the environment, the CSI of a plurality of wireless signals. The operations may include determining a ToF and AoA of one or more reflected path signal components of each wireless signal based on the obtained CSI. The operations may include estimating locations of points on one or more surfaces within the area based on the ToF and AoA of the one or more reflected path signal components of the wireless signals. The operations may include generating map information for the area of the environment based on the estimated locations of the points on the one or more surfaces. In some implementations, generating the map information of the area of the environment may be further based on the CSI of one or more wireless signals received by another AP associated with the area of the environment. In one implementation, generating the map information includes estimating the locations of the points on the one or more surfaces based on the ToF and AoA of different groups of wireless signals received by the AP at different times.

In various implementations, the operations may include determining map information for the entire environment based on an aggregation of the map information generated for the area of the environment and map information generated for one or more other areas of the environment. In some instances, the map information generated for each of the one or more other areas of the environment may be based on the CSI of wireless signals received by one or more other respective APs. In addition, or in the alternative, determining the map information for the environment may be further based on locations of the APs associated with each of the areas of the environment, one or more coverage gaps between the areas of the environment, or any combination thereof.

The ToF of the reflected path signal component of a respective wireless signal may indicate a distance between the AP and a corresponding point, and the AoA of the reflected path signal component of the respective wireless signal may indicate a direction of the corresponding point relative to the AP. In various implementations, the ToF and AoA are determined only for the reflected path signal components having an SNR, SINR, RSSI, RSRP, or RSRQ greater than a value. In some instances, the wireless signals may include (but are not limited to) measurement frames, NDPs, sounding frames, sounding signals, reference signals, probe requests, probe responses, ACK frames, action frames, or any combination thereof.

In some implementations, the wireless signals may be received from one or more STAs or UEs within a coverage area of the AP. The operations may include determining a ToF and AoA of a direct path signal component of each wireless signal based on the obtained CSI, and estimating locations of the one or more STAs or UEs based on the ToF and AoA of the direct path signal components of the wireless signals received from the respective STAs or UEs. The direct path signal component of a respective wireless signal may be the signal component of the respective wireless signal that has the shortest ToF. The operations may include selectively adjusting the estimated locations of the points on the one or more surfaces based on the estimated locations of the respective STAs or UEs. In some instances, the wireless signals are transmitted over K tones or frequency subcarriers and are received by N antenna elements of the AP, the ToF and AoA of the direct path signal component of a respective wireless signal is determined concurrently with the ToF and AoA of the one or more reflected path signal components of the respective wireless signal based on a 2D Fourier transform of the CSI of the respective wireless signal transmitted over the K tones or frequency subcarriers and received by the N antenna elements of the AP, and both K and N are integers greater than 1. In some other instances, the ToF and AoA of the direct path signal components and the ToF and AoA of the reflected path signal components of the wireless signals may be determined based on a machine learning model trained with the CSI of wireless signals received from one or more transmitter devices having known locations.

In various implementations, estimating the location of each point may include determining an image source associated with the point based on the estimated location of a respective STA or UE and the ToF and AoA of a corresponding reflected path signal component of the wireless signal received from the respective STA or UE, determining a first line extending between the AP and the image source, determining a second line extending between the image source and the estimated location of the respective STA or UE, determining a third line that is a perpendicular bisector of the second line, and determining the location of the point as an intersection of the first line and the third line.

In some implementations, the operations may include determining a movement of at least one of the STAs or UEs. The operations may include obtaining, from the AP, the CSI of one or more additional wireless signals received from the at least one STA or UE. The operations may include determining the ToF and AoA of the direct path signal component and the ToF and AoA of the reflected path signal components of each additional wireless signal based on the CSI of the respective additional wireless signal. The operations may include estimating locations of one or more additional points on the one or more surfaces based on the ToF and AoA of the direct path signal component and the ToF and AoA of the one or more reflected path signal components of each of the additional wireless signals.

In some other implementations, the wireless signals may be transmitted by the AP. In some instances, the wireless signals may be monostatic signals. In one implementation, the operations may include determining an amount of signal leakage associated with the direct path signal components of the wireless signals transmitted by the AP. The operations may also include adjusting the CSI obtained for the wireless signals transmitted by the AP based on the determined amount of signal leakage.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
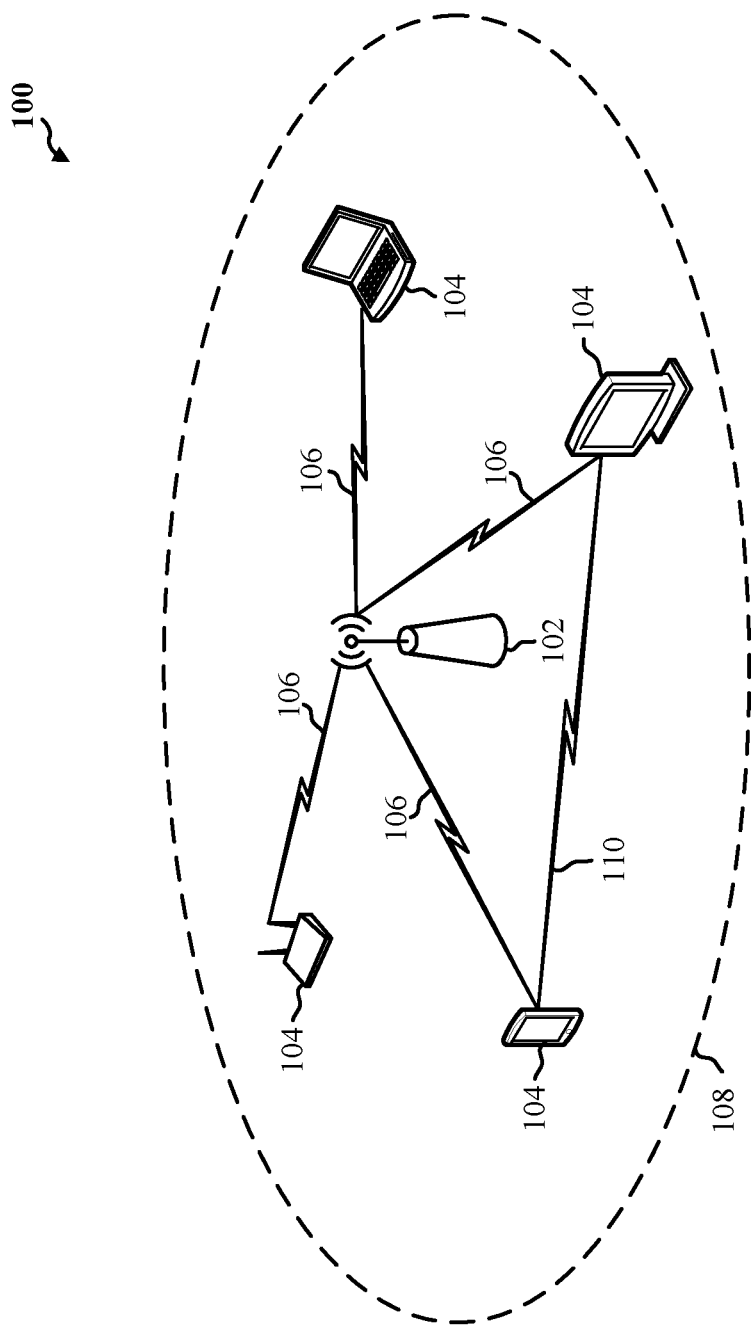
FIG. 1 shows a pictorial diagram of an example wireless communication network.

Aspects of the disclosure are provided in the following description and drawings directed to various examples provided herein for illustration purposes. However, persons of ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. Moreover, the described implementations can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal frequency division multiple access (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (JOT) network.

WLANs may be formed by one or more APs that provide a shared wireless medium for use by a plurality of wireless devices such as STAs and UEs. The continuing deployment of APs in both public and private communication networks has made it possible for positioning and navigation systems to use these APs to determine the locations of STAs and UEs, especially in areas with high concentrations of active APs (e.g., urban cores, shopping centers, office buildings, sporting venues, and so on). For example, the round trip time (RTT) or time-of-flight (ToF) of signals exchanged between a STA and an AP can be used to determine the distance between the STA and the AP. The distances between the STA and three APs having known locations can be used to determine the position of the STA using trilateration techniques. In addition, angle information of the exchanged signals can be used to determine the position of the STA relative to the AP. For example, the angle-of-arrival (AoA) of a wireless signal received from a STA can be used to determine the direction of the STA relative to the AP, and the angle-of-departure (AoD) of a wireless signal transmitted to the STA can be used to determine the direction of the STA relative to the AP.

As discussed, RF sensing techniques may use wireless signals reflected from walls and other physical features of an area to estimate the locations of the walls and other physical features. Monostatic sensing generally refers to a system in which the same wireless device transmits and receives the wireless signals that are used to determine the locations of walls and other physical features of an area. In some aspects, monostatic sensing techniques are similar to conventional monostatic radar. Multi-static sensing generally refers to a system in which two or more wireless devices participate in the sensing, with one wireless device transmitting the wireless signals and another wireless device receiving the wireless signals.

In accordance with various implementations, methods and systems are disclosed that can generate map information of an environment using wireless signals received by a plurality of APs or base stations located throughout the environment. Specifically, systems disclosed herein can use channel state information (CSI) of wireless signals received by different APs or base stations associated with different areas of the environment to determine the locations of walls, barriers, and other physical features of one or more corresponding areas of the environment. The locations of walls, barriers, and other physical features determined using the CSI of wireless signals received by one or more APs or base stations associated with a respective area can be used to generate map information for the respective area. Map information generated for the different areas of the environment can be aggregated or otherwise combined to generate map information for the entire environment. In some instances, the map information may include (but is not limited to) floor plan, layout maps, navigational maps, and so on.

In some implementations, the wireless signals received by a respective AP may be transmitted by one or more STAs or UEs associated with the respective AP and/or located within a coverage area of the respective AP. Each of the received wireless signals may include a direct path signal component and one or more reflected path signal components. The direct path signal component of a respective wireless signal travels along a line-of-sight (LoS) path between the AP and a corresponding STA. The ToF of the direct path signal component may indicate a distance between the AP and the corresponding STA, and the AoA of the direct path signal component may indicate a direction of the corresponding STA relative to the AP. Each of the reflected path signal components of the respective wireless signal travels along a corresponding non-line-of-sight (NLoS) path between the corresponding STA and the AP. The NLoS path of a reflected path signal component may include reflections from one or more points or surfaces with the area of the environment. The ToF of the reflected path signal component may indicate a distance between the AP and a corresponding point or surface within the area, and the AoA of the reflected path signal component may indicate a direction of the corresponding point or surface relative to the AP.

The system can determine the ToF and AoA of the direct path signal component and the ToF and AoA of each reflected path signal component of a respective wireless signal based on the CSI obtained for the respective wireless signal. The system can estimate the location of the corresponding STA based on the ToF and AoA of the direct path signal component of the respective wireless signal. In some implementations, the system can estimate the locations of points on one or more surfaces within the area based on the ToF and AoA of the reflected path signal components of the respective wireless signal. In some instances, the system can update or adjust the estimated locations of the points in response to the estimated locations of the STAs from which the wireless signals are received. In other implementations, the system can estimate the locations of the points based on the ToF and AoA information of the reflected path signal components of the respective wireless signal and the estimated location of the corresponding STA. The system can generate map information for the area of the environment based on the estimated locations of the points on the one or more surfaces within the area. The system can aggregate or combine map information generated for a plurality of areas of the environment to determine map information for the entire environment.

In some other implementations, the wireless signals received by a respective AP may be transmitted by the respective AP. That is, the wireless signals may be monostatic signals in these other implementations. The direct path signal component of a monostatic signal travels along a LoS path between the transmit and receive antenna resources of the respective AP. Each reflected path signal component of the monostatic signal travels along a corresponding NLoS path that includes reflections from one or more points or surfaces with the area of the environment. The ToF of a respective reflected path signal component may indicate a distance between the AP and the corresponding point or surface within the area, and the AoA of the respective reflected path signal component may indicate a direction of the corresponding point or surface relative to the AP.

The ToF and AoA determined for the reflected path signal components of the respective monostatic signal may be influenced by interference associated with the direct path signal component of the respective monostatic signal. Specifically, the direct path signal component of the respective monostatic signal may constitute undesirable leakage between antenna resources of the AP. As such, in some implementations, the system can determine an amount of signal leakage associated with the direct path signal components of the monostatic signals, and adjust the CSI obtained for the monostatic signals based on the determined amount of signal leakage. In some instances, the system can remove portions of the CSI obtained for a respective monostatic signal that are associated with the direct path signal component of the respective monostatic signal. The system can determine the ToF and AoA of the reflected path signal components of the monostatic signals using the adjusted CSI.

The system can estimate the locations of points on one or more surfaces within the area based on the ToF and AoA of the reflected path signal components of the monostatic signals. The system can generate map information for the area of the environment based on the estimated locations of the points on the one or more surfaces within the area. The system can aggregate or combine map information generated for a plurality of areas of the environment to determine map information for the entire environment.

Several aspects of wireless networks are described with reference to various apparatus and methods for generating map information of an environment. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a block diagram of an example wireless communication network 100. In some implementations, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 may also be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
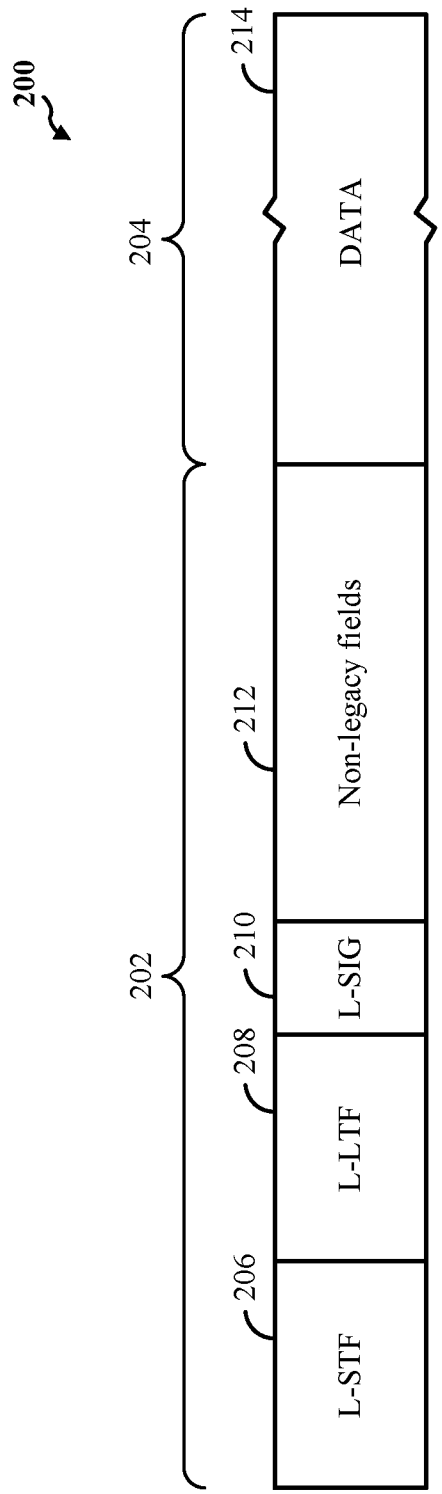
FIG. 2A shows an example protocol data unit (PDU) usable for communications between an access point (AP) and a number of wireless stations (STAs).

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204 after the preamble, for example, in the form of a PSDU including a data field 214. For example, the PHY preamble 202 may include a legacy portion that itself includes a legacy short training field (L-STF) 206, a legacy long training field (L-LTF) 208, and a legacy signaling field (L-SIG) 210. The PHY preamble 202 also may include a non-legacy portion including one or more non-legacy fields 212. The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
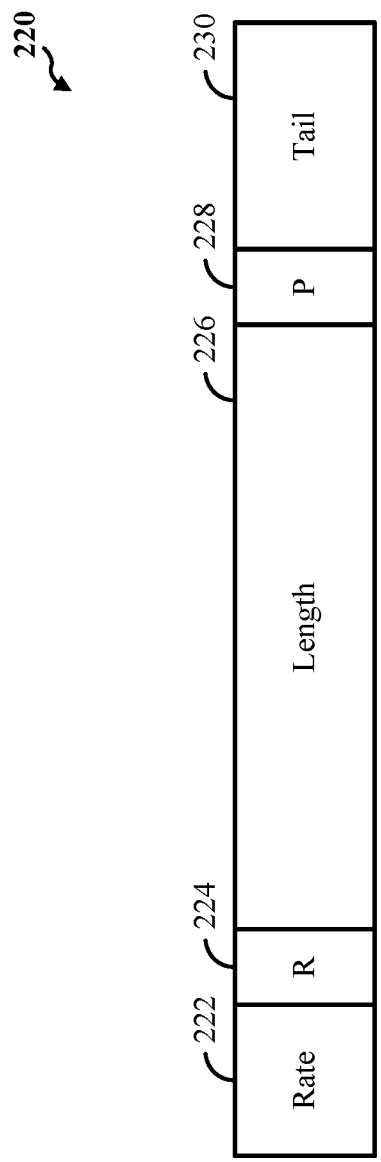
FIG. 2B shows an example field in the PDU of FIG. 2A.

FIG. 2B shows an example L-SIG field 220 in the PDU of FIG. 2A. The L-SIG 220 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (µs).

Figure 3A:
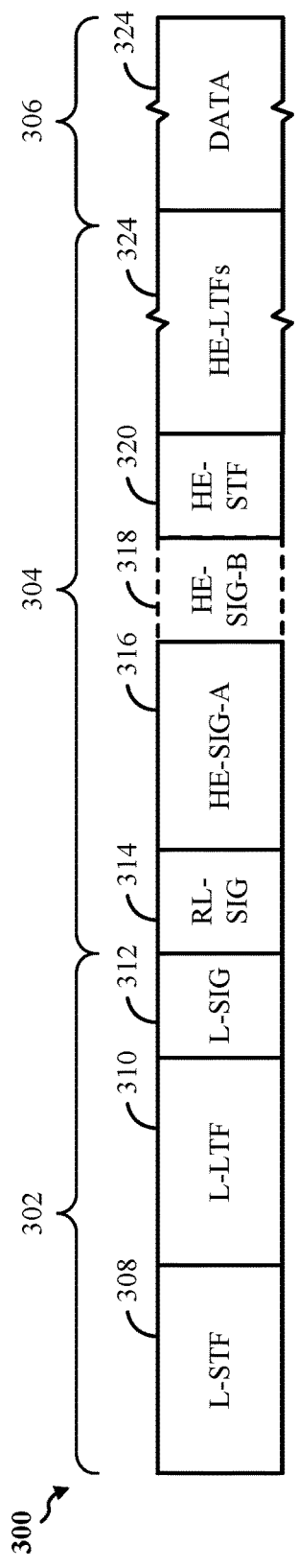
FIG. 3A shows an example physical layer (PHY) preamble usable for communications between an AP and each of a number of STAs.

FIG. 3A shows an example PHY preamble 300 usable for wireless communication between an AP and one or more STAs. The PHY preamble 300 may be used for SU, OFDMA or MU-MIMO transmissions. The PHY preamble 300 may be formatted as a High Efficiency (HE) WLAN PHY preamble in accordance with the IEEE 802.11ax amendment to the IEEE 802.11 wireless communication protocol standard. The PHY preamble 300 includes a legacy portion 302 and a non-legacy portion 304. The PHY preamble 300 may be followed by a PHY payload 306, for example, in the form of a PSDU including a data field 324.

The legacy portion 302 of the PHY preamble 300 includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) LTFs 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU carrying the PHY preamble 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE- SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
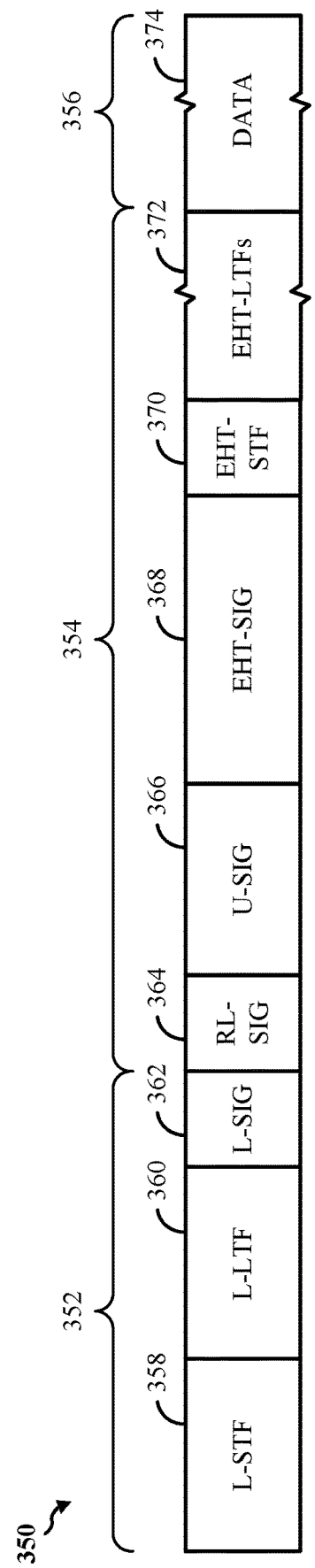
FIG. 3B shows another example PHY preamble usable for communications between an AP and each of a number of STAs.

FIG. 3B shows another example PHY preamble 350 usable for wireless communication between an AP and one or more STAs. The PHY preamble 350 may be used for SU, OFDMA or MU-MIMO transmissions. The PHY preamble 350 may be formatted as an Extreme High Throughput (EHT) WLAN PHY preamble in accordance with the IEEE 802.11be amendment to the IEEE 802.11 wireless communication protocol standard, or may be formatted as a PHY preamble conforming to any later (post-EHT) version of a new wireless communication protocol conforming to a future IEEE 802.11 wireless communication protocol standard or other wireless communication standard. The PHY preamble 350 includes a legacy portion 352 and a non-legacy portion 354. The PHY preamble 350 may be followed by a PHY payload 356, for example, in the form of a PSDU including a data field 374.

The legacy portion 352 of the PHY preamble 350 includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PDU carrying the PHY preamble 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
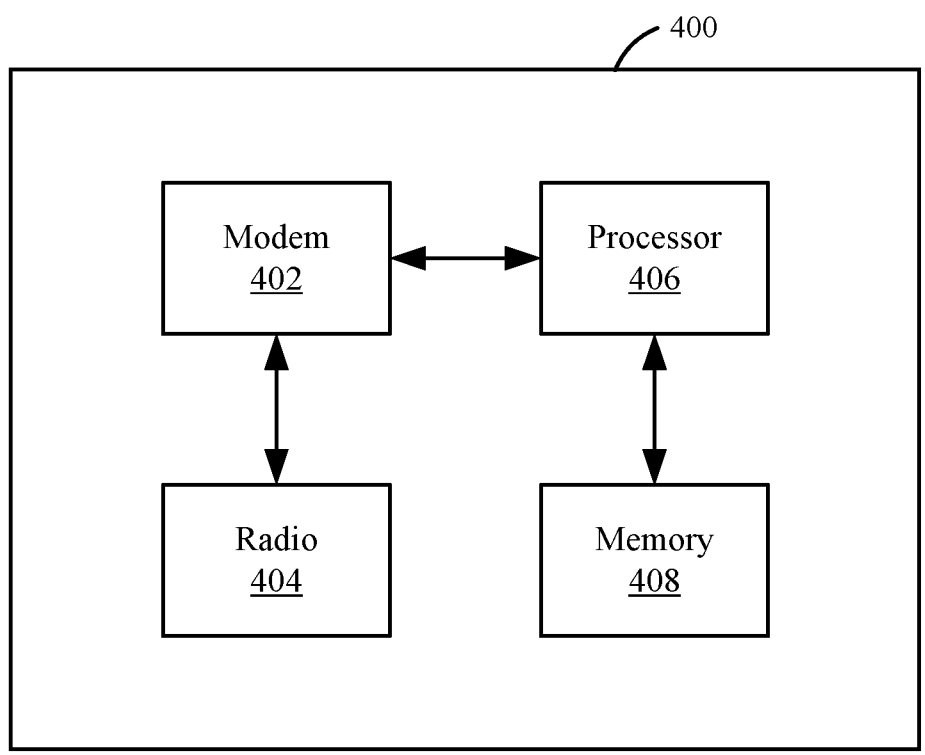
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some other implementations, the wireless communication device 400 can be an example of a device for use in an AP such as the AP 102 described above with reference to FIG. 1. In some other implementations, the wireless communication device 400 can include a processing system and an interface configured to perform the described functions.

The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 400 can be, or can include, a chip, system on chip (SoC), chipset, package, or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 400 further includes one or more processors, processing blocks or processing elements 406 (collectively "the processor 406"), and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer, and a demultiplexer. For example, while in a transmission mode, data obtained from the processor 406 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 406) for processing, evaluation, or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which transmits the symbols via the coupled antennas. Similarly, symbols received via the antennas are obtained by the radio 404, which provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor 406 to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 5B:
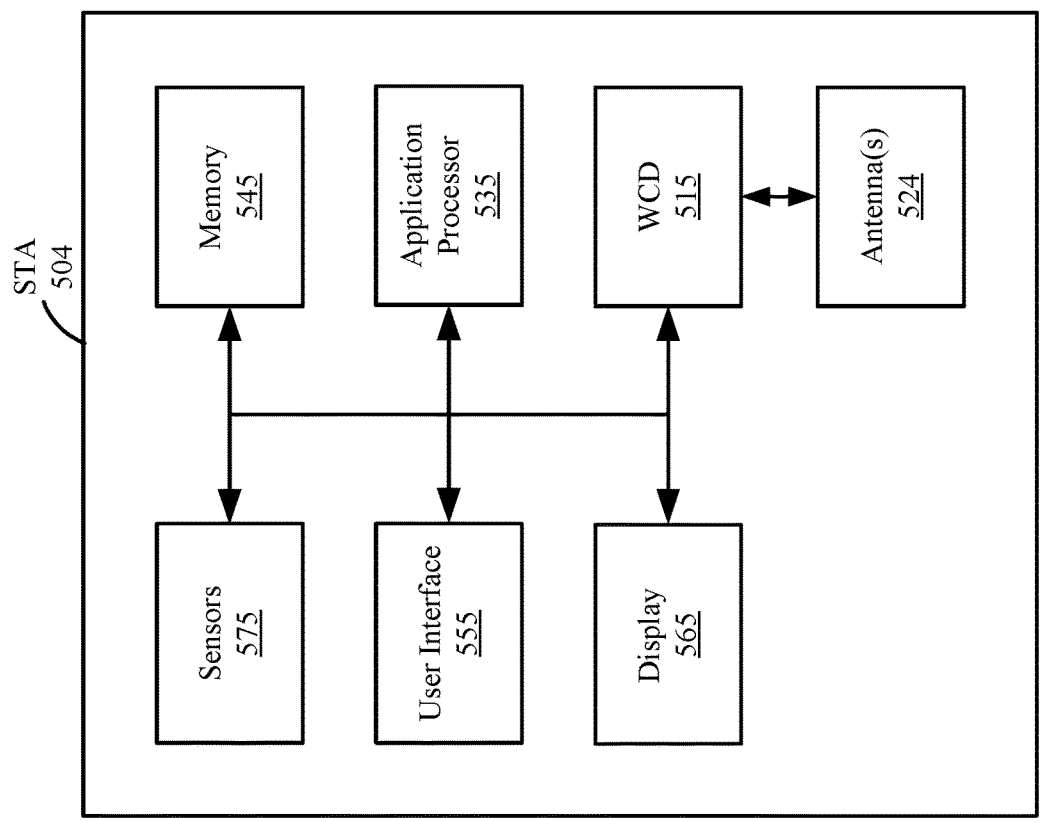
FIG. 5B shows a block diagram of an example STA.
Figure 5A:
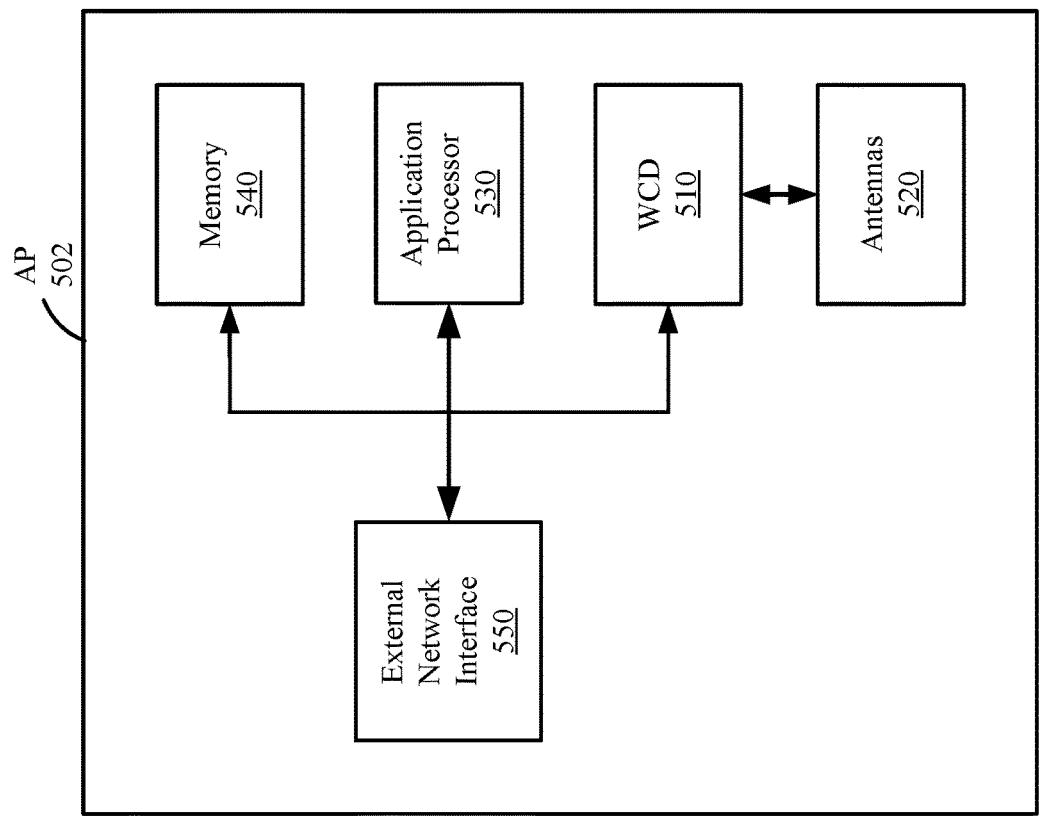
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Any of the aforementioned components can communicate with other components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565. In some other implementations, the STA 504 may include a processing system and an interface configured to perform the described functions.

As discussed, methods and systems disclosed herein can use the CSI of wireless signals received by one or more APs or base stations associated with each of a plurality of different areas of an environment to determine the locations of walls, barriers, and other physical features of the respective areas of the environment. The locations of the walls, barriers, and other physical features determined for a respective area can be used to generate map information for the respective area. The system can aggregate or combine map information generated for the different areas of the environment to determine map information for the entire environment.

Figure 6:
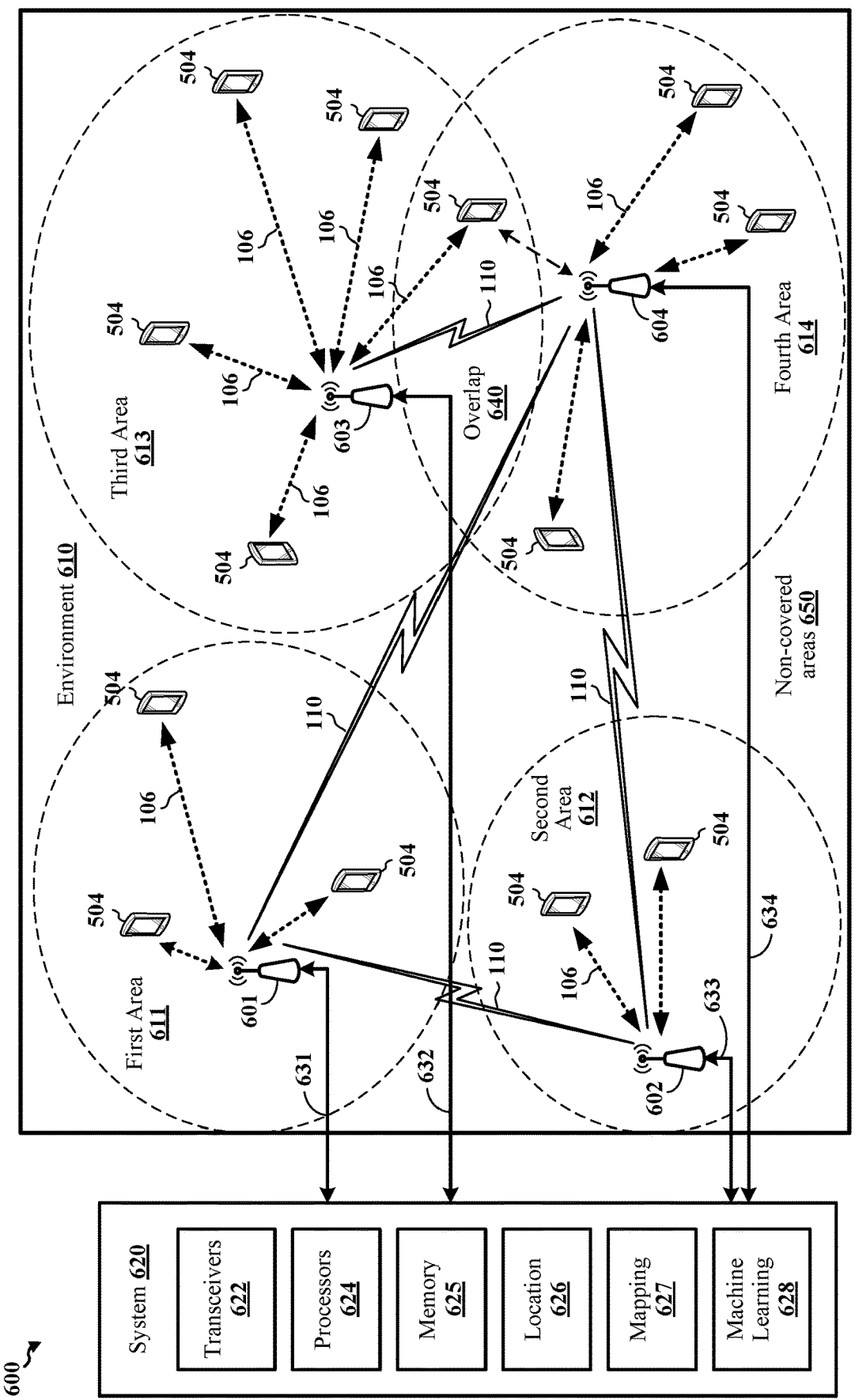
FIG. 6 shows an illustration depicting an environment and a system for generating map information of the environment, according to some implementations.

FIG. 6 shows an illustration 600 depicting an environment 610 and a system 620 for generating map information of the environment 610, according to some implementations. The environment 610 may be any suitable place, structure, venue, destination, region, or location for which map information is desired. In some instances, the environment 610 may be an indoor environment such as (but not limited to) an airport, shopping mall, office building, arena, museum, and so on. In other instances, the environment 610 may be an outdoor environment such as (but not limited to) a fairground, an amusement park, a stadium, and so on.

In various implementations, a plurality of wireless communication devices such as (but not limited to) APs 601-604 positioned throughout the environment 610 can be used to determine the locations of various points, surfaces, walls, boundaries, corridors, halls, structures, and other physical features of the environment 610. The APs 601-604 may communicate with each other via communication links 110, and may communicate with the system 620 via respective communication links 631-634. Each of the APs 601-604 may be associated with a BSS, and may provide wireless connectivity for one or more STAs 504 associated with the BSS. The APs 601-604 may communicate with the STAs 504 via communication links 106. In some instances, a group of APs may form an ESS. In other instances, a group of APs may belong to a multi-link device (MLD) such as an AP MLD. In some other instances, a group of APs may form a multiple BSSID set.

In some implementations, each of the APs 601-604 may be associated with a corresponding area of the environment 610. For example, a first AP 601 may be associated with a first area 611, a second AP 602 may be associated with a second area 612, a third AP 603 may be associated with a third area 613, and a fourth AP 604 may be associated with a fourth area 614. In some implementations, the different areas 611-614 of the environment 610 may correspond to wireless coverage areas provided by the respective APs 601-604. For example, the first area 611 may correspond to the wireless coverage area of the first AP 601, the second area 612 may correspond to the wireless coverage area of the second AP 602, the third area 613 may correspond to the wireless coverage area of the third AP 603, and the fourth area 614 may correspond to the wireless coverage area of the fourth AP 604. Although only four APs 601-604 are shown in FIG. 1 for simplicity, the environment 610 may include or may be associated with other numbers of APs or base stations.

Some of the areas of an environment (such as the environment 610 of FIG. 6) may overlap one another, while other areas of the environment may not overlap with each another. In some implementations, the environment may include one or more regions common to or shared by different areas of the environment, and/or may include one or more other regions that do not lie within or overlap any of the different areas of the environment. For the example of FIG. 6, the third and fourth areas 613-614 overlap each other, and may define an overlap region 640 that is common to the third and fourth areas 613-614 of the environment. A respective STA 504 located in the overlap region 640 may also be located in both of the third and fourth areas 613-614 concurrently. In some instances, the respective STA 504 may have wireless connectivity in each of the third and fourth areas 613-614 of the environment 610, and both of the third and fourth APs 603-604 may be able to receive wireless transmissions from the respective STA 504. As such, the wireless signals transmitted by the respective STA 504 may be used by one or both of the third AP 603 or the fourth AP to determine the locations of points, surfaces, walls, and/or other physical features in their respective areas 603 and 604.

As shown in the example of FIG. 6, neither the first area 611 nor the second area 612 overlaps other areas of the environment 610. Moreover, coverage gaps 650 may exist between the different areas 611-614 of the environment 610. In some instances, the coverage gaps 650 may define areas or regions that are not in the wireless coverage areas of the APs 601-604. A respective STA 504 that is located in these areas or regions may not be able to receive wireless signals from the APs 601-604, which may prevent the respective STA 504 from participating in ranging operations with the APs 601-604 or receiving location information from the APs 601-604. Similarly, the APs 601-604 may not be able to receive any wireless signals from the respective STA 504 located in these areas or regions. As such, it may be difficult to obtain map information for these areas or regions using wireless signals received by one or more groups of APs located in different areas of the environment 610.

The APs 601-604 can determine or obtain the CSI of wireless signals received in their respective areas 601-604. The CSI of a wireless signal may be used to determine the ToF and AoA of the direct path signal component of the wireless signal, and to determine the ToF and AoA of each reflected path signal component of the wireless signal. The ToF and AoA of the direct path signal component, and the ToF's and AoA's of the reflected path signal components of a wireless signal (collectively referred to as the ToF and AoA information) can be determined using any suitable technique.

The ToF and AoA of the reflected path signal components of a wireless signal can be used to estimate the locations of points or surfaces in a corresponding area of the environment 610, and the ToF and AoA of the direct path signal component of the wireless signal can be used to estimate the location of the STA 504 that transmitted the wireless signal. In some implementations, the APs 601-604 may obtain the channel frequency response of a wireless signal, determine the channel impulse response of the wireless signal, and use the channel impulse response to distinguish between the direct path signal component and the reflected path signal components of the wireless signal. For example, a respective AP may determine the channel impulse response of a wireless signal based on an inverse discrete Fourier transfer (DFT) function or a partial inverse DFT function of the channel frequency response of the wireless signal. The channel frequency response provides a frequency-domain representation of the wireless signal, and the channel impulse response provides a time-domain representation of the wireless signal. When a wireless signal includes a direct path signal component (e.g., a line-of-sight (LOS) signal component) and a number of reflected path signal components (e.g., non-LOS (NLOS) signal components), the channel impulse response may be a superposition of multiple pulses corresponding to the LOS and NLOS signal components. Each of the multiple pulses may be associated with a corresponding peak or "tap" in the channel impulse response at a corresponding time value. Since the direct path signal component normally arrives at a receiver device before any of the reflected path signal components (and thus has the shortest ToF), the channel impulse response may be used to identify the direct path signal component of the wireless signal, for example, by identifying the tap corresponding to the first arrival time at the receiver. In some instances, the channel impulse response may also be used to identify each of the reflected path signal components of the wireless signal by identifying the taps of the channel impulse response corresponding to different arrival times. For example, the first tap of the channel impulse response may correspond to the direct path signal component (which has the shortest ToF), the second tap of the channel impulse response may correspond to the reflected path signal component having the shortest ToF (but longer than the ToF of the direct path signal component), the third tap of the channel impulse response may correspond to the reflected path signal component having the second-shortest ToF, and so on.

The APs 601-604 may estimate the locations of points, surfaces, walls, or other physical features within their respective areas 611-614 based on the ToF and AoA information of the reflected path signal components of wireless signals received in their respective areas 611-614. In some instances, the APs 601-604 may provide the locations of points, surfaces, walls, and/or other physical features of their respective areas 611-614 to the system 620, and the system 620 may generate map information for the different areas 611-614. In some other instances, the APs 601-604 may generate map information for their respective areas 611-614 based on the estimated locations. In various implementations, the map information may be iteratively constructed using estimated point locations based on different groups of wireless signals received by the AP at different times. For example, in some instances, an AP may receive a plurality of first wireless signals at a first time, determine ToF and AoA information based on the CSI of the first wireless signals, and estimate the locations of points or walls within the area based on the ToF and AoA information of the first wireless signals. Then, the AP may receive a plurality of second wireless signals at a second time later than the first time, determine ToF and AoA information based on the CSI of the second wireless signals, and estimate the locations of points or walls within the area based on the ToF and AoA information of the second wireless signals. The AP may continue this process until the locations of a threshold number of points or surfaces within the area are determined or estimated. In some instances, the threshold number of points or surfaces may correspond to an acceptable granularity of the map information generated for the area. Generating the map information based on a plurality of wireless signals received by the AP over a period of time may allow the locations of a greater number of unique points or surfaces within the area to be estimated, which in turn may increase the granularity and accuracy of the map information generated for the area (e.g., compared with map information based on wireless signals received by the AP at a particular instance in time).

In some implementations, the APs 601-604 may provide the CSI of a respective wireless signal in response to the AP detecting changes in the CSI of wireless signals received from the same transmitter device, changes in the channel frequency responses of wireless signals received by the AP, changes in the channel impulse responses of wireless signals received by the AP, changes in channel conditions of the wireless medium, or any combination thereof. In some instances, the APs 601-604 provide the CSI of a respective wireless signal to the system 620 only when one or more of the indicated changes exceeds a corresponding threshold value. The changes detected by a respective AP may indicate the movement or updated locations of people, STAs, and/or other objects expected to move or change positions. In addition, or in the alternative, the changes detected by the respective AP may also indicate movement of one or more stationary objects, surfaces, or features of the corresponding area. For example, in some aspects, changes in the CSI and/or changes in channel conditions may indicate the movement, re-positioning, or re-orienting of a wall or other fixed object, surface, or feature in the corresponding area.

In some implementations, the APs 601-604 may distinguish between fixed features of the environment that are to be included in the mapping information (e.g., points, surfaces, walls, and other physical features) and transient features of the environment that are not to be included in the mapping information (e.g., people, pets, shopping carts, and the like). In some instances, the APs 601-604 may distinguish between the fixed features of the environment and the transient features of the environment based on historical CSI obtained by the APs 601-604. For example, if the CSI or signal reflection associated with a respective surface in the environment is consistently detected or determined over a period of time, the APs 601-604 may determine that the respective surface is fixed or stationary and should be included in the mapping information. Conversely, if the CSI or signal reflection associated with a respective surface in the environment is new or has changed by more than an amount during the period of time, the APs 601-604 may determine that the respective surface is transient and should not be included in the mapping information.

In various implementations, CSI is obtained only for the reflected path signal components that have a signal-to-noise ratio (SNR), a signal-to-interference-plus-noise ratio (SINR), a received signal strength indicator (RSSI), a reference signal received power (RSRP), or a reference signal received quality (RSRQ) greater than a threshold value. In some instances, the system 620 may indicate the threshold value to the APs 601-604. In some implementations, the system 620 may instruct one or more of the APs 601-604 to ignore the reflected path signal components having a strength or quality below the threshold value when determining or obtaining the CSI of a wireless signal. By excluding or ignoring relatively weak reflected path signal components of a wireless signal from the CSI of the wireless signal, implementations of the subject matter disclosed herein may improve the accuracy with which the ToF and AoA of relatively strong reflected path signal components of the wireless signal can be determined. Increasing the accuracy of the ToF and AoA information of the reflected path signal components may increase the accuracy with which various points, surfaces, walls, and other physical features within a given area can be estimated or determined.

The system 620 may include one or more transceivers 622, one or more processors 624, a memory 625, a location engine 626, a mapping engine 627, and a machine learning model 628. Although not shown for simplicity, the transceivers 622, processors 624, memory 625, location engine 626, mapping engine 627, and machine learning model 628 may be coupled to one another via a system bus, dedicated signal lines, a programmable interconnect system, or any combination thereof.

The transceivers 622 may be used to exchange information with the APs 601-604 via respective signal lines 631-634. The transceivers 622 may also be used to exchange information with other devices, systems, networks, and/or databases. For example, in some instances, the transceivers 622 may establish connections with external mapping services, mapping databases, location servers, location databases, and/or other suitable resources from which location or mapping information can be obtained. Although not shown in FIG. 6 for simplicity, the transceivers 622 can include any number of transmit chains to process and transmit signals to other wireless devices, and can include any number of receive chains to process signals received from the other wireless devices via the one or more antennas. The transceivers 622 may be configured to operate according to one or more suitable wireless communication protocols such as (but not limited to) wireless communications protocols specified by one or more Releases of the Third Generation Partnership Project (3GPP), by one or more amendments to the IEEE 802.11 family of wireless communication standards, the Bluetooth Interest Group, or other suitable communications technology. For example, in some instances, the system 620 may communicate with the APs 601-604 and/or other devices such as (but not limited to) base stations, STAs, UEs, vehicles, pedestrians, and sensor units using a vehicle-to-everything (V2X) channel of a 5G RAN, a vehicle-to-infrastructure (V2I) channel of a 5G RAN, a sidelink channel of a 5G RAN, an unlicensed frequency band, a peer-to-peer (P2P) connection, or a dedicated short range communication (DSRC) channel. In addition, or in the alternative, the transceivers 622 may be configured for one or more suitable wired communication protocols including (but not limited to) Ethernet, coaxial, or optical communications.

The processors 624 may be or may include any number of microprocessors or central processing units (CPUs) capable of executing scripts or instructions of one or more software programs stored in associated memory (such as memory 625). In addition, or in the alternative, the processors 624 may be or may include any number of Application Specific Integrated Circuits (ASICs), Field Programmable Gate Arrays (FPGAs), Programmable Logic Devices (PLDs), Graphics Processing Units (GPUs), Digital Signal Processors (DSPs), Data Processing Units (DPUs), microcontrollers, hardware accelerator(s), or any combination thereof.

The memory 625 may include a non-transitory computer-readable medium (such as one or more nonvolatile memory elements, such as EPROM, EEPROM, Flash memory, a hard drive, etc.) storing instructions that, when executed by the one or more processors 624, cause the system 620 to perform any number of the operations described with reference to FIGS. 10-15. The instructions may be any set of instructions to be executed directly (such as machine code) or indirectly (such as scripts) by the processors 624. For example, the instructions may be stored as computing device code on the computing device-readable medium. As such, the terms "instructions" and "programs" may be used interchangeably herein. The instructions may be stored in object code format for direct processing by the processor, or in any other computing device language including scripts or collections of independent source code modules.

The location engine 626 may receive or obtain the CSI of the wireless signals from the APs 601-604 via respective communication links 631-634 or other suitable means. The location engine 626 may use the CSI obtained for a wireless signal to determine the ToF and AoA information of the wireless signal. Specifically, the location engine 626 may use the CSI to determine the ToF and AoA of one or more reflected path signal components (such as the reflected path signal components having a strength or quality greater than the threshold value) of a wireless signal. The ToF and AoA of a respective reflected path signal component may be used to estimate the location of a corresponding point or surface from which the wireless signal was reflected.

In some implementations, the location engine 626 may also use the CSI to determine the ToF and AoA of the direct path signal component of the wireless signal. The ToF and AoA of the direct path signal component may be used to estimate the location of a corresponding STA 504 in the environment 610. In some aspects, the location of the STA 504 that transmitted the wireless signal may be used to estimate the location of the corresponding point or surface. In other aspects, the location of the STA 504 that transmitted the wireless signal may be used to adjust a previously estimated location of the corresponding point or surface.

In one implementation, the location engine 626 may concurrently determine the ToF and AoA of the direct path signal component and the ToF's and AoA's of the reflected path signal components of a respective wireless signal using a 2D Fourier transform of the wireless signal's CSI. For example, when the APs 601-604 have linear antenna arrays that include a number N of antenna elements to receive a wireless signal transmitted over a number K of tones or frequency subcarriers, a 2D Fourier transform over K tones and N antenna elements can be used to estimate the ToF and AoA of the direct path signal component of the wireless signal concurrently with estimating the ToF's and AoA's of the reflected path signal components of the wireless signal using the expression:

$$F(\theta, d) = \Sigma_{i=1}^{N} \Sigma_{k=1}^{K} h_{ik} e^{j\frac{2\pi f_0 i l \sin\theta}{c}} e^{j\frac{2\pi d k \Delta f}{c}},$$

where l=the spacing between the N antenna elements of the AP, and F (θ, d) denotes a ToF and AoA profile of the wireless signal. In some instances, the profile F(θ, d) of a wireless signal may include the ToF of the direct path signal component of the wireless signal, the AoA of the direct path signal component of the wireless signal, the ToF of each reflected path signal component of the wireless signal, and the AoA of each reflected path signal component of the wireless signal. In other implementations, the location engine 626 may determine the ToF and AoA information of wireless signals in conjunction with the machine learning model 628. In some implementations, the location engine 626 may estimate the AoA information of a wireless signal using maximum likelihood estimation techniques, Multiple Signal Classification (MUSIC) techniques, Estimation of Signal Parameters using Rotational Invariance Techniques (ESPRIT) techniques, Matrix Pencil techniques, or any combination thereof.

In various implementations, the location engine 626 may estimate the locations of points or surfaces within a respective area of the environment 610 based on the ToF and AoA information of the reflected path signal components of wireless signals received by one or more APs associated with the respective area. For example, the ToF of each reflected path signal component of a wireless signal may indicate the distance between a corresponding point or surface and the AP, and the AoA of each reflected path signal component of the wireless signal may indicate the direction of the corresponding point or surface relative to the AP. In some implementations, the location engine 626 may selectively adjust the estimated locations of various points or surfaces within a respective area based on the estimated locations of the transmitting STAs associated with the respective area. As discussed, the location of a respective STA 504 may be estimated using the ToF and AoA of the direct path signal component of wireless signals received from the respective STA 504.

The mapping engine 627 may generate map information for the environment 610. The map information may be indicative of the layout, dimensions, size, and attributes of the environment 610, and may show the locations of physical features within the environment 610 such as (but not limited to) walls, rooms, doorways, hallways, corridors, ceilings, tables, chairs, people, carts, and so on. In some implementations, the mapping engine 627 may generate map information of a respective area of the environment 610 based on the estimated locations of the points or surfaces in the respective area. In other implementations, the mapping engine 627 may generate map information of a respective area using the estimated locations of the points or surfaces in the respective area and the estimated locations of other wireless devices in the respective area. In some other implementations, generating the map information of the area of the environment may be further based on the CSI of one or more wireless signals received by another AP associated with the area of the environment. In addition, or in the alternative, a respective AP provides the CSI of a wireless signal in response to changes in the CSI of wireless signals received by the respective AP, changes in the channel frequency responses of wireless signals received by the respective AP, changes in the channel impulse responses of wireless signals received by the respective AP, changes in channel conditions of a wireless medium associated with the area, or any combination thereof.

In one implementation, the mapping engine 627 may obtain layout and/or structural information for one or more areas of the environment 610 from an external source, and use the obtained layout and/or structural information to adjust or verify the estimated locations of the points, surfaces, and other physical features of the areas. For example, the mapping engine 627 may obtain architectural blueprints, city plans, or other mapping information of an area of the environment 610, and use the obtained blueprints or city plans to verify the estimated locations of walls, ceilings, hallways, and other physical features of the area.

The mapping engine 627 may aggregate map information for different areas of the environment to determine map information for the entire environment 610. For example, map information generated for each of the different areas 611-614 can be fused, stitched, or otherwise combined with each other to generate a composite map for the entire environment 610. In some implementations, the map information generated for each of the one or more other areas of the environment may be based on the CSI of wireless signals received by one or more other respective APs. In some instances, determining the map information for the environment may be further based on locations of the APs associated with each of the areas of the environment, one or more coverage gaps between the areas of the environment, or any combination thereof. In some implementations, determining the map information for the environment based on an aggregation of the map information generated for the area of the environment and map information generated for one or more other areas of the environment.

In some other implementations, the machine learning model 628 may be used to determine the ToF and AoA information of wireless signals received by the APs 601-604. In various implementations, the machine learning model 628 may be trained with the CSI of wireless signals received from one or more transmitter devices having known locations, for example, to learn and/or predict the relationship between the CSI of a wireless signal and the ToF and AoA information of the wireless signal. Once the machine learning model 628 is trained, the CSI of wireless signals received by the APs 601-604 may be provided to the machine learning model 628 as input data. The trained machine learning model 628 may determine the ToF and AoA information of the direct and reflected path signal components of the wireless signals, for example, using a neural network.

Figure 7:
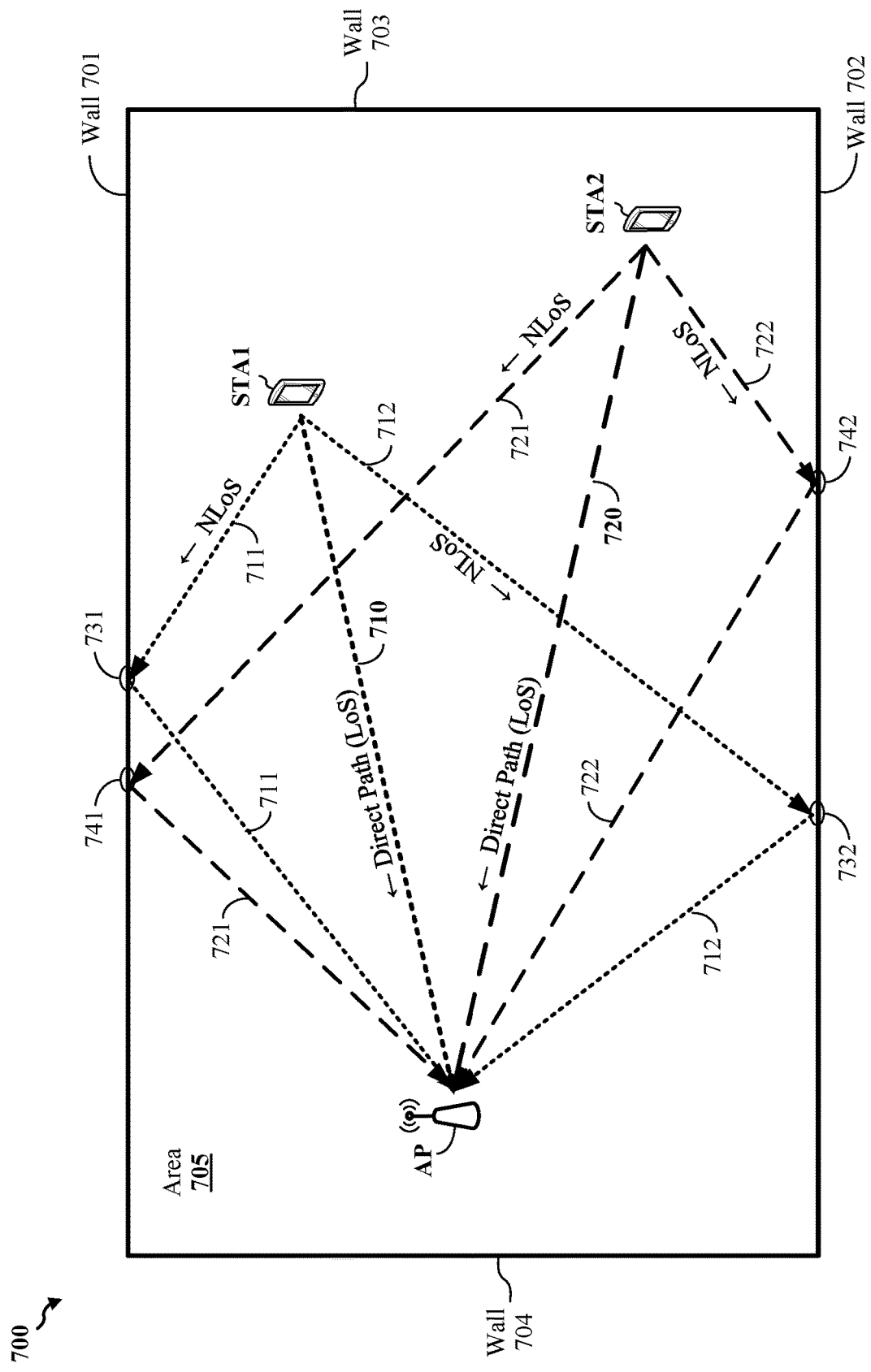
FIG. 7 shows an illustration depicting an AP receiving wireless signals in an area of an environment, according to some implementations.

FIG. 7 shows an illustration 700 depicting an AP receiving wireless signals, according to some implementations. As shown, the AP receives wireless signals from two wireless stations STA1-STA2 in an area 705 defined or bounded by walls 701-704. The walls 701-704 may represent any wall, barrier, surface, or other physical feature that can reflect wireless signals transmitted from one or more of the AP, STA1, and STA2. Although only two STAs are shown in the example of FIG. 7, in other instances, the AP may receive wireless signals from a greater number of STAs or UEs. Similarly, although only one AP is shown in the example of FIG. 7, in other instances, two or more APs or base stations may be used to receive and/or determine the CSI of wireless signals received in the area 705.

In the example of FIG. 7, STA1 transmits a wireless signal including a direct path signal component 710 and a number of reflected path signal components (only two reflected path signal components 711-712 shown for simplicity). The direct path signal component 710 travels along a line-of-sight (LoS) path from STA1 to the AP, while each of the reflected path signal components 711-712 travels along a corresponding non-line-of-sight (NLoS) path from STA1 to the AP. Specifically, a first reflected path signal component 711 is reflected by a first point or surface 731 on the first wall 701 and received by the AP, and a second reflected path signal component 712 is reflected by a second point or surface 732 on the second wall 702 and received by the AP. Since the direct path signal component 710, the first reflected path signal component 711, and the second reflected signal path component 712 travel different distances along different paths between STA1 and the AP, the direct path signal component 710, the first reflected path signal component 711, and the second reflected signal path component 712 may arrive at the AP at different times and/or at different angles. In some instances, the different arrival times of the signal components 710-712 can be used to distinguish the direct path signal component 710 from each of the reflected path signal components 711-712. For example, in some aspects, the direct path signal component may be identified based on the channel impulse response tap corresponding to the first arrival path (FAP), and each of the reflected path signal components may be identified based on channel impulse response taps corresponding to the next arrival paths.

The direct path signal component 710 travels along the LoS path between STA1 and the AP, and thus the ToF and AoA of the direct path signal component 710 can be used to estimate the location of STA1 relative to the AP. The first reflected path signal component 711 travels along a first NLoS path and is reflected by the first point or surface 731, and thus the ToF and AoA of the first reflected path signal component 711 can be used to estimate the location of the first point or surface 731. The second reflected path signal component 712 travels along a second NLoS path and is reflected by the second point or surface 732, and thus the ToF and AoA of the second reflected path signal component 712 can be used to estimate the location of the second point or surface 732. In some implementations, the location of STA1 may be used in conjunction with the ToF and AoA information of the reflected path signal components 711-712 to estimate the locations of the first and second points or surfaces 731 and 732, respectively. In other implementations, the location of STA1 may be used to selectively adjust the estimated locations of the first and second points or surfaces 731 and 732.

In the example of FIG. 7, STA2 transmits a wireless signal including a direct path signal component 720 and a number of reflected path signal components (only two reflected path signal components 721-722 shown for simplicity). The direct path signal component 720 travels along the LoS path from STA2 to the AP, while each of the reflected path signal components 721-722 travels along a corresponding NLoS path from STA2 to the AP. Specifically, a first reflected path signal component 721 is reflected by a third point or surface 741 on the first wall 701 and received by the AP, and a second reflected path signal component 722 is reflected by a fourth point or surface 742 on the second wall 702 and received by the AP. The direct path signal component 720, the first reflected path signal component 721, and the second reflected signal path component 722 may arrive at the AP at different times and/or at different arrival angles. In some instances, the different arrival times of the signal components 720-722 can be used to distinguish the direct path signal component 720 from each of the reflected path signal components 721-722. For example, in some aspects, the direct path signal component may be identified based on the channel impulse response tap corresponding to the FAP, and each of the reflected path signal components may be identified based on channel impulse response taps corresponding to the next arrival paths.

The direct path signal component 720 travels along the LoS path between STA2 and the AP, and thus the ToF and AoA of the direct path signal component 720 can be used to estimate the location of STA2 relative to the AP. The first reflected path signal component 721 travels along a first NLoS path and is reflected by the third point or surface 741, and thus the ToF and AoA of the first reflected path signal component 721 can be used to estimate the location of the third point or surface 741. The second reflected path signal component 722 travels along a second NLoS path and is reflected by the fourth point or surface 742, and thus the ToF and AoA of the second reflected path signal component 722 can be used to estimate the location of the fourth point or surface 742. In some implementations, the location of STA2 may be used in conjunction with the ToF and AoA information of the reflected path signal components 721-722 to estimate the locations of the third and fourth points or surfaces 741 and 742, respectively. In other implementations, the location of STA2 may be used to selectively adjust the estimated locations of the third and fourth points or surfaces 741 and 742.

Figure 8A:
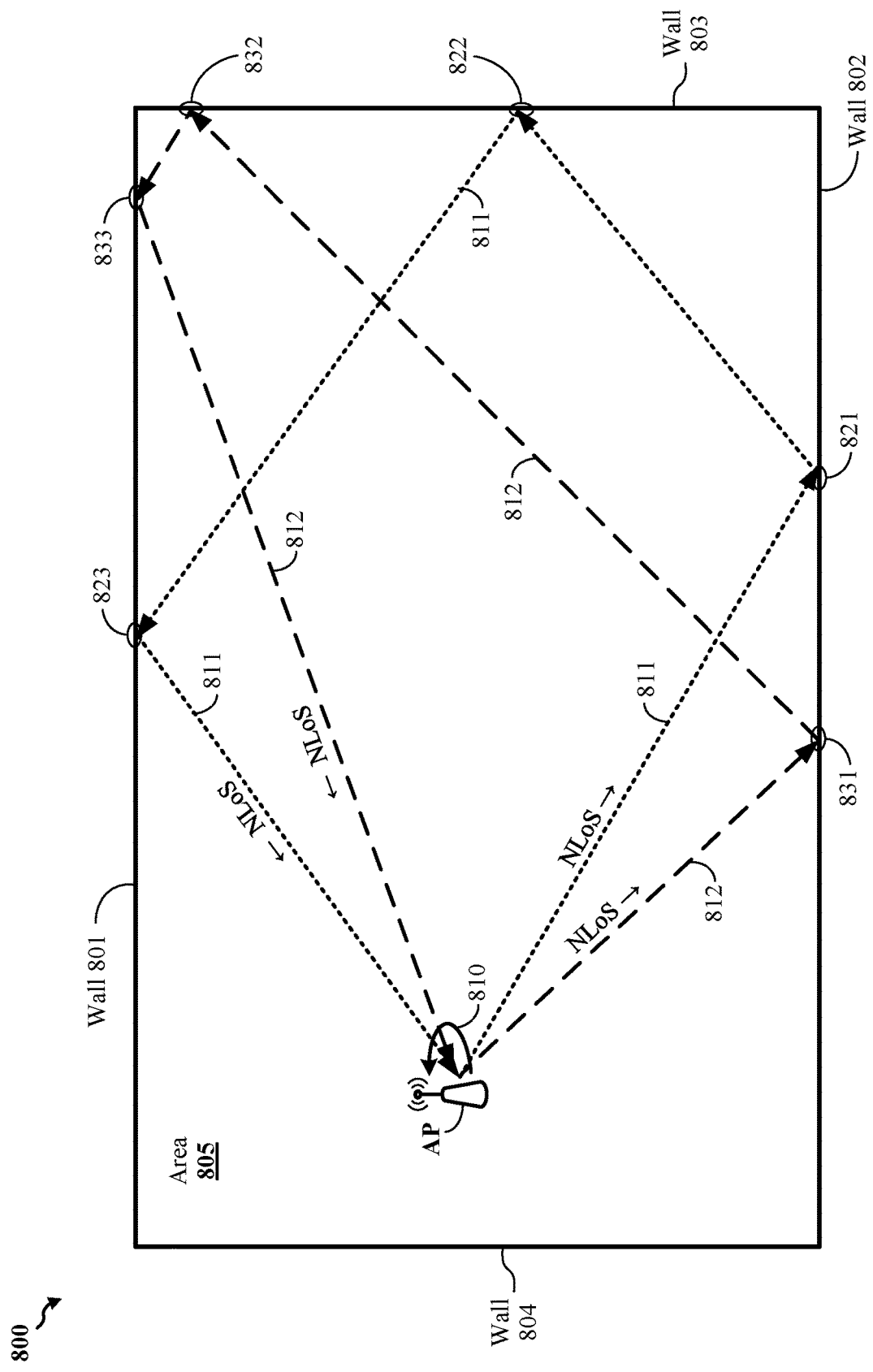
FIG. 8A shows an illustration depicting an AP receiving wireless signals in an area of an environment, according to other implementations.

FIG. 8A shows an illustration 800 depicting an AP receiving wireless signals, according to other implementations. The illustration 800 includes an area 805 defined or bounded by walls 801-804, and is shown to include a single AP. The walls 801-804 may represent any wall, surface, or other physical feature of the environment that can reflect wireless signals. In other implementations, the area 805 may include two or more APs from which the CSI of received wireless signals can be obtained.

As shown, the AP may transmit a wireless signal including a direct path signal component 810 and a number of reflected path signal components (only two reflected path signal components 811-812 shown for simplicity). The direct path signal component 810 travels along a LoS path from the transmit antennas of the AP to the receive antennas of the AP. The reflected path signal components 811-812 travel along corresponding NLoS paths that reflect from points or surfaces on one or more of the walls 801-804 defining the area 805.

Specifically, the first reflected path signal component 811 is reflected by a first point or surface 821 on wall 802, by a second point or surface 822 on wall 803, by a third point or surface 823 on wall 801, and then received by the AP. The second reflected path signal component 812 is reflected by a second point or surface 831 on wall 802, by a second point or surface 832 on wall 803, by a second point or surface 833 on wall 801, and then received by the AP. Each of the reflected path signal components 811-812 may arrive at the AP at different times and/or at different angles. The first reflected path signal component 811 can be used to estimate the locations of corresponding points or surfaces 821-823, and the second reflected path signal component 812 can be used to estimate the locations of corresponding points or surfaces 831-833.

The direct path signal component 810 travels directly from the AP's transmit antennas to the AP's receive antennas. As such, the direct path signal component 810 may be considered a monostatic signal associated with an amount of leakage between the transmit and receive antenna resources of the AP. The signal leakage associated with the direct path signal component 810 may interfere with the reflected path signal components 811-812 of the wireless signal, which in turn may decrease the accuracy which with the locations of the points or surfaces 821-823 and 831-833 can be estimated or determined.

In some implementations, the signal leakage associated with the direct path signal component 810 can be used to remove or cancel portions of the obtained CSI associated with the direct path signal component 810. In some instances, the location engine 626 may process the CSI of a wireless signal to remove the CSI associated with the direct path signal component of the wireless signal. In other instances, the machine learning model 628 may be trained to adjust or modify the ToF and AoA information determined for the reflected path signal components of a wireless signal based on the CSI of the direct path signal component of the wireless signal. In this way, the relatively strong direct path signal component 810 of a respective wireless signal may be prevented from distorting and/or altering the CSI of the relatively weak reflected path signal components 811-812 of the respective wireless signal. This may increase the accuracy with which the ToF and AoA information of the relatively weak reflected path signal components 811-812 can be estimated or determined.

In some other implementations, iterative leakage cancellation may be used to remove or cancel portions of the obtained CSI associated with the direct path signal component 810. For example, the location engine 626 may estimate the leakage associated with the direct path signal component 810, remove the estimated leakage from the obtained CSI, and then determine whether the remaining or residual leakage is greater than a threshold amount. If the remaining or residual leakage is not greater than the threshold amount, the location engine 626 may determine that the remaining or residual leakage is negligible (or at least acceptable). Conversely, if the remaining or residual leakage is greater than the threshold amount, the location engine 626 may remove the remaining or residual leakage from the obtained CSI, and determine whether the remaining or residual leakage is greater than the threshold amount. This process may continue until the remaining or residual leakage is less than the threshold amount. As discussed, the threshold amount may correspond to a negligible or acceptable amount of residual leakage.

In one implementation, the amount of leakage attributable to the direct path signal component 810 can be used to estimate the ToF of one or more of the reflected path signal components 811-812. In some instances, the location engine 626 can determine a difference between the ToF of the direct path signal component 810 and the ToF of a respective reflected path signal component, and then estimate the ToF of the respective reflected path signal component based on the ToF of the direct path signal component 810.

Figure 8B:
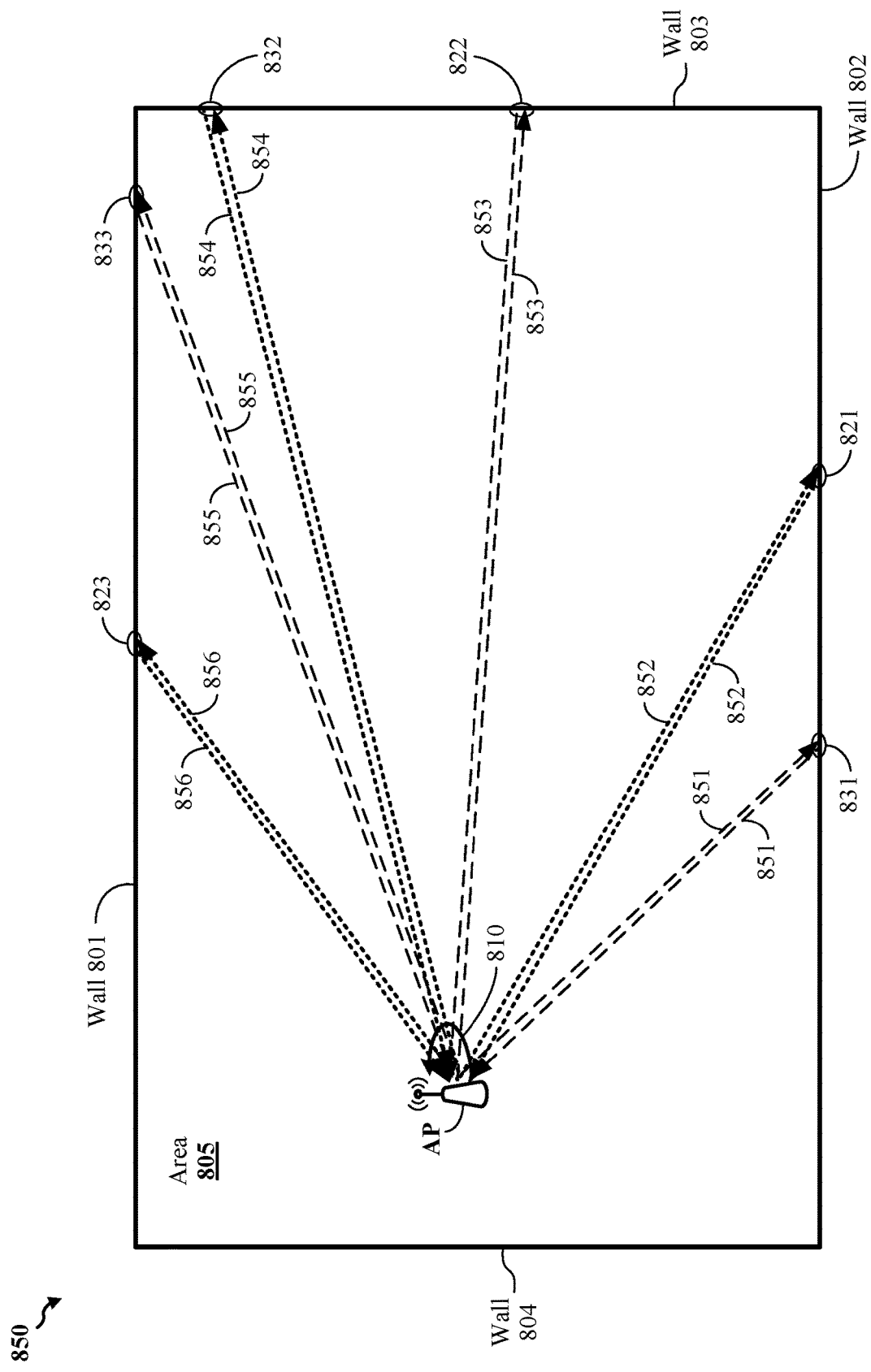
FIG. 8B shows an illustration depicting an AP receiving wireless signals in an area of an environment, according to some other implementations.

FIG. 8B shows an illustration 850 depicting an AP receiving wireless signals, according to some other implementations. The illustration 850 includes the area 805 described with reference to FIG. 8A, and is shown to include a single AP transmitting a wireless signal including a direct path signal component 810 and a number of reflected path signal components 851-856. As described, the direct path signal component 810 travels along a path from the transmit antennas of the AP to the receive antennas of the AP. The reflected path signal components 851-856 travel along paths that reflect from corresponding points or surfaces on the walls 801-804 back to the AP. In some instances, the surfaces of the walls 801-804 are uneven such that irregular surface angles of the walls 801-804 can reflect the signal components 851-856 directly back to the AP (e.g., without reflecting off other surfaces or walls within the area 805). Specifically, the first reflected path signal component 851 is reflected by the point or surface 831 on wall 802 back to the AP, the second reflected path signal component 852 is reflected by the point or surface 821 on wall 802 back to the AP, the third reflected path signal component 853 is reflected by the point or surface 822 on wall 803 back to the AP, the fourth reflected path signal component 854 is reflected by the point or surface 832 on wall 803 back to the AP, the fifth reflected path signal component 855 is reflected by the point or surface 833 on wall 801 back to the AP, and the sixth reflected path signal component 856 is reflected by the point or surface 823 on wall 801 back to the AP.

Each of the reflected path signal components 851-856 may arrive at the AP at different times and/or at different angles. As such, the ToF and AoA information of the first reflected path signal component 851 can be used to estimate the location of corresponding point or surface 831, the ToF and AoA information of the second reflected path signal component 852 can be used to estimate the location of corresponding point or surface 821, the ToF and AoA information of the third reflected path signal component 853 can be used to estimate the location of corresponding point or surface 822, the ToF and AoA information of the fourth reflected path signal component 854 can be used to estimate the location of corresponding point or surface 832, the ToF and AoA information of the fifth reflected path signal component 855 can be used to estimate the location of corresponding point or surface 833, and the ToF and AoA information of the sixth reflected path signal component 856 can be used to estimate the location of corresponding point or surface 823.

Figure 9:
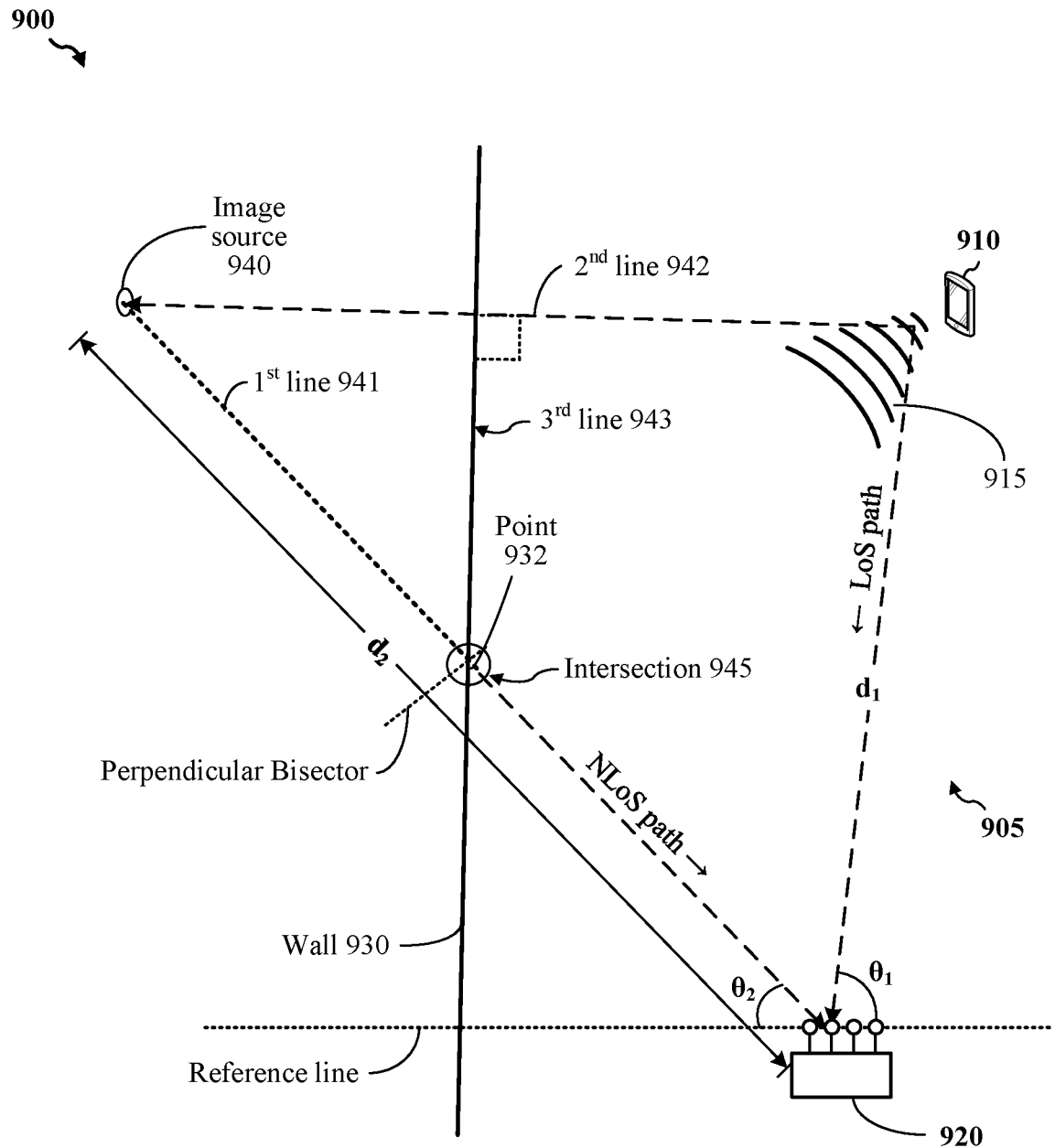
FIG. 9 shows an illustration depicting a receiver device determining locations of points in an environment based on received wireless signals, according to some implementations.

FIG. 9 shows an illustration 900 depicting a receiver device determining locations of points in an area 905 of an environment based on received wireless signals, according to some implementations. The area 905 is shown to include a transmitter device 910, a receiver device 920, and a wall 930. In various implementations, the area 905 may be or may correspond to the area 705 of FIG. 7, the area 805 of FIGS. 8A-8B, the coverage area of an AP or base station, or any other suitable area of the environment. In some instances, the wall 930 may be or may correspond to one or more of the walls 701-704 of FIG. 7 or the walls 801-804 of FIGS. 8A-8B. The transmitter device 910 may be any suitable wireless communication device such as (but not limited to) the STA 104 of FIG. 1, the STA 504 of FIG. 5B, or the STAs of FIGS. 6, 7, 8A, and 8B. The receiver device 920 may be any suitable wireless communication device such as (but not limited to) the AP 102 of FIG. 1, the AP 502 of FIG. 5A, or the APs of FIGS. 6, 7, 8A, and 8B.

The transmitter device 910 may transmit one or more wireless signals 915 that are received by the receiver device 920. As shown, a reflected path signal component of the wireless signal 915 transmitted by the transmitter device 910 is reflected by a surface point 932 on the wall 930 and received by the receiver device 920. The receiver device 920 may determine the location of the surface point 932 using the location of the transmitter device 910 and the ToF and AoA of the reflected path signal component of the wireless signal 915. In some instances for which the receiver device 920 includes a number N of receiving antenna elements and the wireless signal 915 is transmitted over a number K of tones or frequency subcarriers, the receiver device 920 may determine or obtain a CSI matrix of the wireless signal 915 using the expression:

CSI Matrix: $H=[h_{ik}]$, $i=1, k=1, \ldots, K,$ where i is an integer between 1 and the number N of receiving antenna elements, and k is an integer between 1 and the number K of subcarriers over which the wireless signal 915 is transmitted.

As discussed above, when the receiver device 920 has a linear antenna array including N receiving antenna elements and the wireless signal 915 is transmitted over K tones or frequency subcarriers, a 2D Fourier transform can be used to concurrently estimate the ToF and AoA of the direct path signal component of the wireless signal 915 and the ToF and AoA of one or more reflected path signal components of the wireless signal 915 using the expression:

$$F(\theta, d) = \Sigma_{i=1}^{N} \Sigma_{k=1}^{K} h_{ik} e^{j\frac{2\pi f_0 i l \sin\theta}{c}} e^{j\frac{2\pi d k \Delta f}{c}},$$

where l=the spacing between antenna elements of the receiver device 920, i is an integer between 1 and N, k is an integer between 1 and K, and $F(\theta, d)$ denotes a ToF and AoA profile of the wireless signal 915. In some instances, the profile $F(\theta, d)$ of the wireless signal 915 includes the ToF of the direct path signal component of the wireless signal 915, the AoA of the direct path signal component, the ToF of each reflected path signal component of the wireless signal 915, and the AoA of each reflected path signal component. For example, the receiver device 920 may estimate the AoA of the LoS path ($\theta_1$), the distance ($d_1$) between the transmitter device 910 and the receiver device 920 along the LoS path, the AoA of the NLoS path ($\theta_2$), and the distance ($d_2$) between the receiver device 920 and an image source 940 corresponding to the surface point 932.

In various implementations, the image source 940 may be defined as the point for which a LoS path would have the same AoA and ToF values as the NLoS path of the reflected path signal component transmitted from the transmitter device 910, reflected by a point 932 on the wall 930, and received by the receiver device 920. The values of $\theta_1$, $d_1$, $\theta_2$, and $d_2$ determined for the wireless signal 915 can be used to determine the location (e.g., the Cartesian coordinates) of the transmitter device 910 and the image source 940. The estimated location of the transmitter device 910 and the image source 940 can be used to estimate the boundaries (e.g., the length and/or orientation) of the wall 930.

In some instances, the location of the surface point 932 on the wall 930 may be determined by the perpendicular bisector of a line extending between the transmitter device 910 and the image source 940. Specifically, the receiver device 920 may determine a first line 941 extending between the receiver device 920 and the image source 940, and may determine a second line 942 extending between the image source 940 and the estimated location of the transmitter device 910. The receiver device 920 may determine a third line 943 that is a perpendicular bisector of the second line 942. The receiver device 920 may estimate or determine the location of the surface point 932 as the intersection 945 of the first line 941 and the third line 943. The receiver device 920 may estimate or determine the locations of additional points on the wall 930 based on other reflected path signal components of the wireless signal 915, based on the reflected path signal components of other wireless signals transmitted by the transmitter device 910 from other positions within or near the area 905, based on the reflected path signal components of wireless signals transmitted by other transmitter devices in or near the area 905, or any combination thereof.

Figure 10:
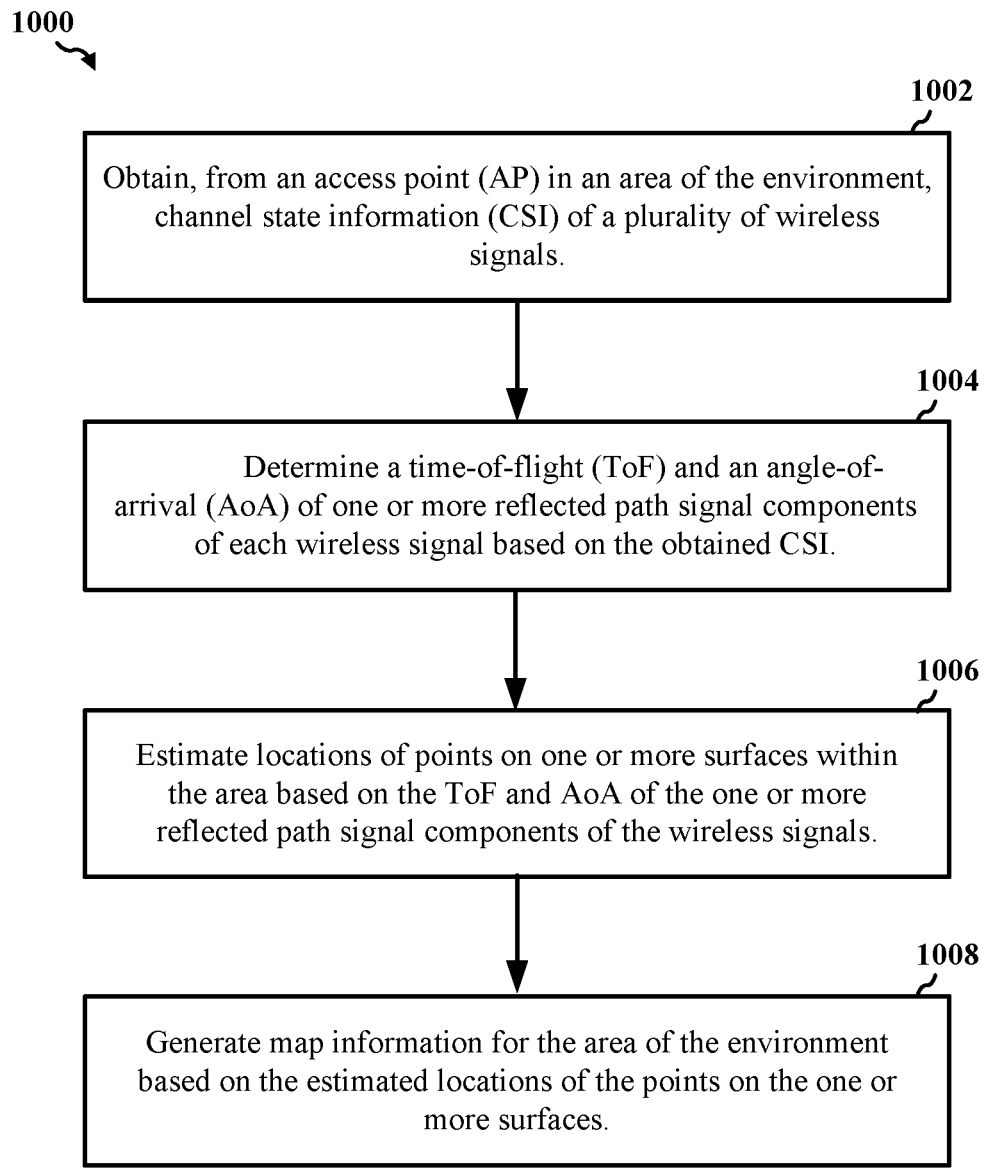
FIG. 10 shows a flowchart illustrating an example operation for generating map information for an environment, according to some implementations.

FIG. 10 shows a flowchart illustrating an example operation 1000 for generating map information for an environment, according to some implementations. The environment may be any suitable environment, destination, region, location, or venue for which map information is desired. In some instances, the environment may be an indoor environment such as (but not limited to) an airport, shopping mall, office building, arena, museum, and so on. In other instances, the environment may be an outdoor environment such as (but not limited to) a fairground, an amusement park, a stadium, and so on. In various implementations, the operation 1000 may be performed by a system coupled to one or more APs associated with one or more corresponding areas of the environment. In some implementations, the APs may be examples of the AP 102 of FIG. 1, the AP 502 of FIG. 5A, the APs 601-604 of FIG. 6, or the APs of FIGS. 7 and 8. In other implementations, the APs may be other suitable wireless communication devices including (but not limited to) a base station, a STA, or a UE.

For example, at block 1002, the system obtains channel state information (CSI) of a plurality of wireless signals from an AP in an area of the environment. At block 1004, the system determines a time-of-flight (ToF) and an angle-of-arrival (AoA) of one or more reflected path signal components of each wireless signal based on the obtained CSI. At block 1006, the system estimates locations of points on one or more surfaces within the area based on the ToF and AoA of the one or more reflected path signal components of the wireless signals. At block 1008, the system generates map information for the area of the environment based on the estimated locations of the points on the one or more surfaces. In some implementations, generating the map information of the area of the environment may be further based on the CSI of one or more wireless signals received by another AP associated with the area of the environment. In one implementation, generating the map information includes estimating the locations of the points on the one or more surfaces based on the ToF and AoA of different groups of wireless signals received by the AP at different times.

In some implementations, the wireless signals are received from one or more wireless stations (STAs) or user equipment (UE) within a coverage area of the AP. The ToF of the reflected path signal component of a respective wireless signal may indicate a distance between the AP and a corresponding point, and the AoA of the reflected path signal component of the respective wireless signal may indicate a direction of the corresponding point relative to the AP. In various implementations, the ToF and AoA are determined only for the reflected path signal components having a signal-to-noise ratio (SNR), a signal-to-interference-plus-noise ratio (SINR), a received signal strength indicator (RSSI), a reference signal received power (RSRP), or a reference signal received quality (RSRQ) greater than a value. In some instances, the wireless signals include measurement frames, null data packets (NDPs), sounding frames, sounding signals, reference signals, probe requests, probe responses, acknowledgement (ACK) frames, action frames, or any combination thereof.

In some implementations, the AP may provide the CSI of a respective wireless signal received over a wireless medium to the system in response to the AP detecting changes in the CSI of wireless signals received from the same transmitter device, changes in the channel frequency responses of wireless signals received by the AP, changes in the channel impulse responses of wireless signals received by the AP, changes in channel conditions of the wireless medium, or any combination thereof.

Figure 11:
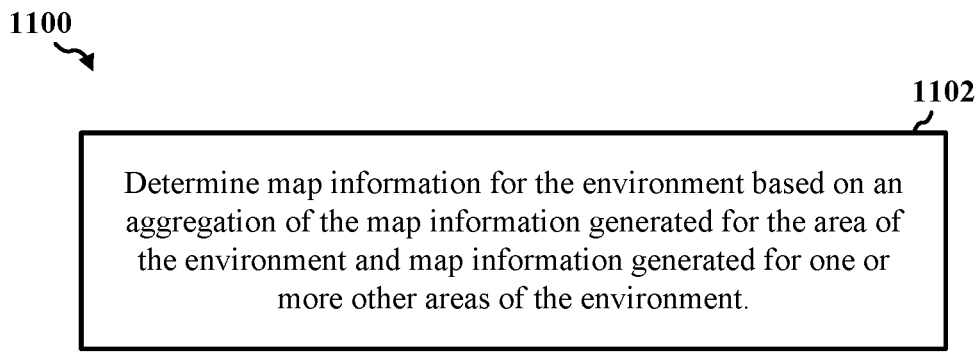
FIG. 11 shows a flowchart illustrating another example operation for generating map information for an environment, according to some implementations.

FIG. 11 shows a flowchart illustrating another example operation 1100 for generating map information for an environment, according to some implementations. The environment may be any suitable environment, destination, region, location, or venue for which map information is desired. In some instances, the environment may be an indoor environment such as (but not limited to) an airport, shopping mall, office building, arena, museum, and so on. In other instances, the environment may be an outdoor environment such as (but not limited to) a fairground, an amusement park, a stadium, and so on. In various implementations, the operation 1100 may be performed by a system coupled to one or more APs associated with one or more corresponding areas of the environment. In some implementations, the APs may be examples of the AP 102 of FIG. 1, the AP 502 of FIG. 5A, the APs 601-604 of FIG. 6, or the APs of FIGS. 7 and 8. In other implementations, the APs may be other suitable wireless communication devices including (but not limited to) a base station, a STA, or a UE.

In some implementations, the operation 1100 may be performed after generating map information for the area of the environment in block 1008 of FIG. 10. For example, at block 1102, the system determines map information for the environment based on an aggregation of the map information generated for the area of the environment and map information generated for one or more other areas of the environment. In some instances, the map information generated for each of the one or more other areas of the environment may be based on the CSI of wireless signals received by one or more other respective APs. In addition, or in the alternative, determining the map information for the environment may be further based on locations of the APs associated with each of the areas of the environment, one or more coverage gaps between the areas of the environment, or any combination thereof.

Figure 12:
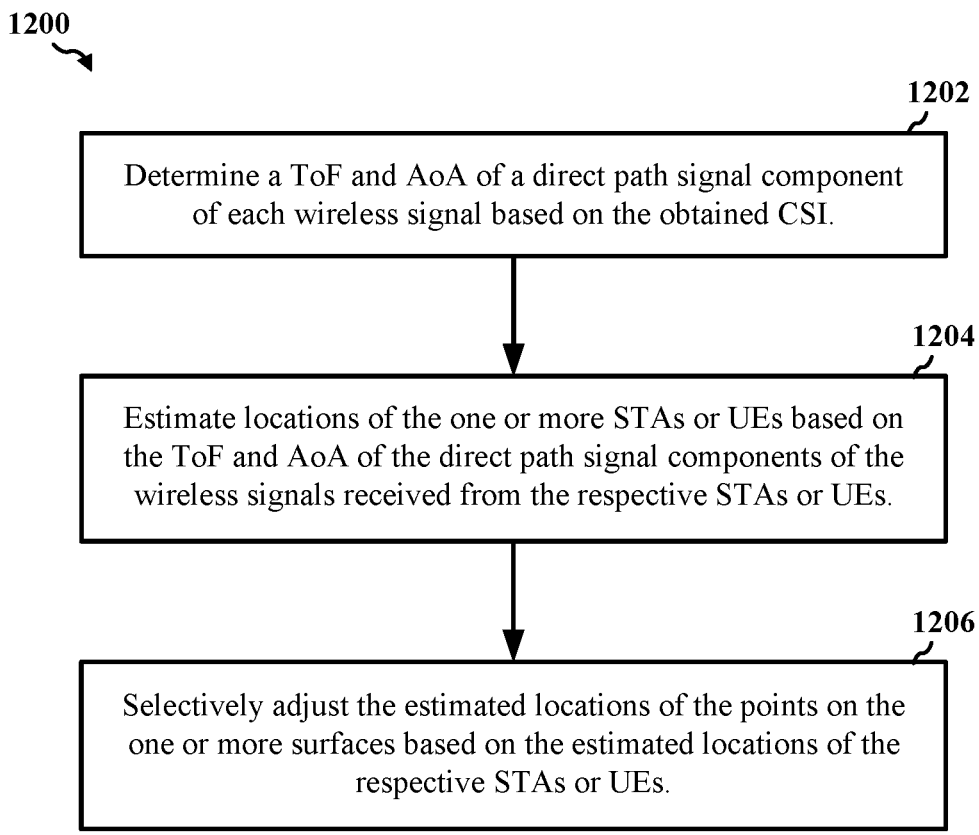
FIG. 12 shows a flowchart illustrating an example operation for adjusting estimated locations of points in an environment, according to some implementations.

FIG. 12 shows a flowchart illustrating an example operation 1200 for adjusting estimated locations of points in an environment, according to some implementations. The environment may be any suitable environment, destination, region, location, or venue for which map information is desired. In some instances, the environment may be an indoor environment such as (but not limited to) an airport, shopping mall, office building, arena, museum, and so on. In other instances, the environment may be an outdoor environment such as (but not limited to) a fairground, an amusement park, a stadium, and so on. In various implementations, the operation 1200 may be performed by a system coupled to one or more APs associated with one or more corresponding areas of the environment. In some implementations, the APs may be examples of the AP 102 of FIG. 1, the AP 502 of FIG. 5A, the APs 601-604 of FIG. 6, or the APs of FIGS. 7 and 8. In other implementations, the APs may be other suitable wireless communication devices including (but not limited to) a base station, a STA, or a UE. For the operation 1200, the wireless signals may be received from one or more STAs or UEs within a coverage area of the AP.

In some implementations, the operation 1200 may be performed in conjunction with estimating the locations of the points in block 1006 of FIG. 10. For example, at block 1202, the system determines a ToF and AoA for a direct path signal component of each wireless signal based on the obtained CSI. At block 1204, the system estimates locations of the one or more STAs or UEs based on the ToF and AoA of the direct path signal components of the wireless signals received from the respective STAs or UEs. At block 1206, the system selectively adjusts the estimated locations of the points on the one or more surfaces based on the estimated locations of the respective STAs or UEs. The direct path signal component of a respective wireless signal is the signal component of the respective wireless signal that has the shortest ToF.

In some implementations, the wireless signals are transmitted over K tones or frequency subcarriers and are received by N antenna elements of the AP, and the ToF and AoA of the direct path signal component of a respective wireless signal can be determined concurrently with the ToF and AoA of the one or more reflected path signal components of the respective wireless signal based on a two-dimensional (2D) Fourier transform of the CSI of the respective wireless signal transmitted over the K tones or frequency subcarriers and received by the N antenna elements of the AP, where both K and N are integers greater than 1. In some other implementations, the ToF and AoA for the direct path signal components and the one or more reflected path signal components of the wireless signals can be determined based on a machine learning model trained with the CSI of wireless signals received from one or more transmitter devices having known locations.

Figure 13:
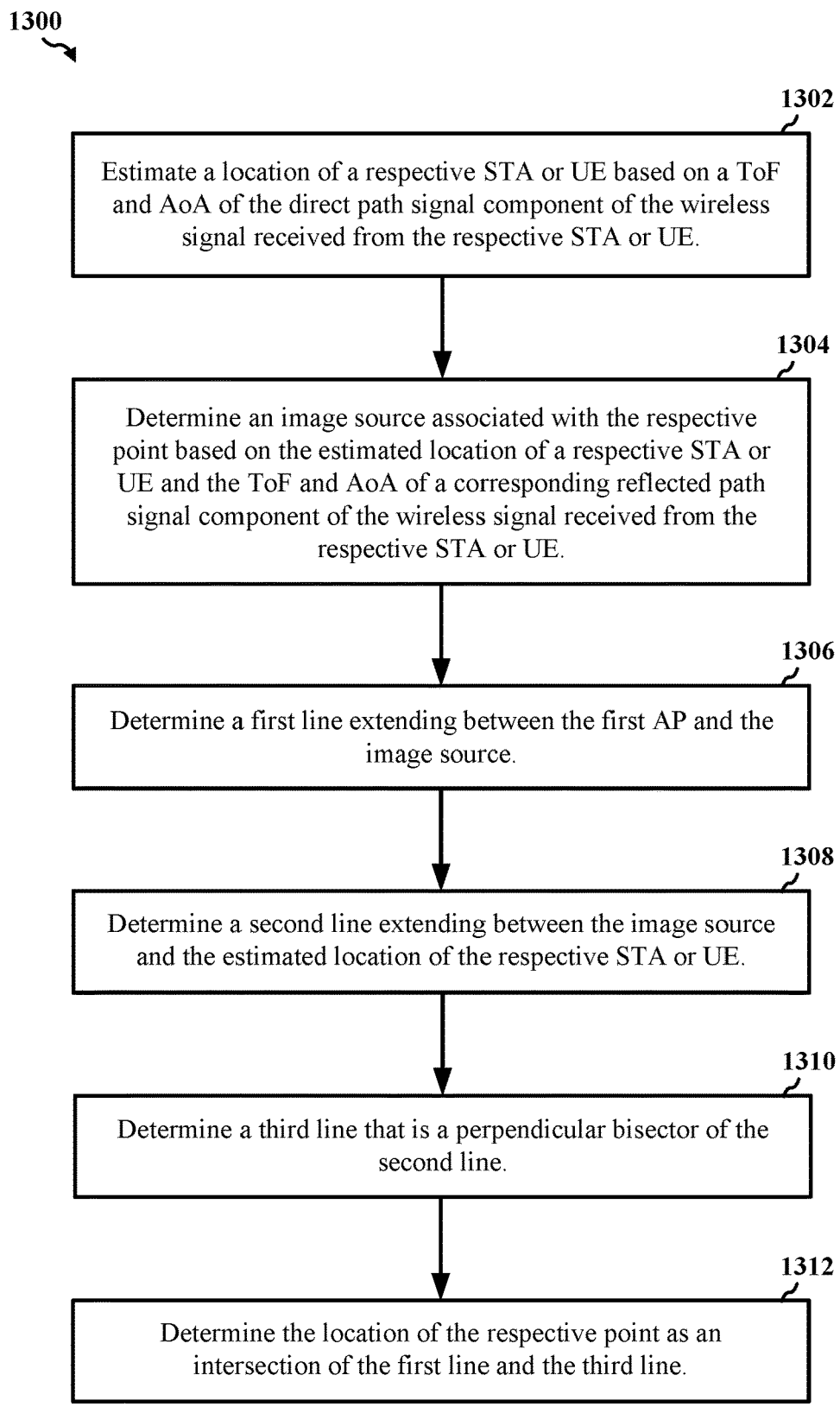
FIG. 13 shows a flowchart illustrating an example operation for estimating locations of points in an environment, according to some implementations.

FIG. 13 shows a flowchart illustrating an example operation 1300 for estimating locations of points in an environment, according to some implementations. The environment may be any suitable environment, destination, region, location, or venue for which map information is desired. In some instances, the environment may be an indoor environment such as (but not limited to) an airport, shopping mall, office building, arena, museum, and so on. In other instances, the environment may be an outdoor environment such as (but not limited to) a fairground, an amusement park, a stadium, and so on. In various implementations, the operation 1300 may be performed by a system coupled to one or more APs associated with one or more corresponding areas of the environment. In some implementations, the APs may be examples of the AP 102 of FIG. 1, the AP 502 of FIG. 5A, the APs 601-604 of FIG. 6, or the APs of FIGS. 7 and 8. In other implementations, the APs may be other suitable wireless communication devices including (but not limited to) a base station, a STA, or a UE. For the operation 1300, the wireless signals may be received from one or more STAs or UEs within a coverage area of the AP.

In some implementations, the operation 1300 may be one example of estimating the locations of the points in block 1006 of FIG. 10. For example, at block 1302, the system estimates a location of a respective STA or UE based on a ToF and AoA of the direct path signal component of the wireless signal received from the respective STA or UE. At block 1304, the system determines an image source associated with the respective point based on the estimated location of the respective STA or UE and the ToF and AoA of a corresponding reflected path signal component of the wireless signal received from the respective STA or UE. At block 1306, the system determines a first line extending between the AP and the image source. At block 1308, the system determines a second line extending between the image source and the estimated location of the respective STA or UE. At block 1310, the system determines a third line that is a perpendicular bisector of the second line. At block 1312, the system determines the location of the respective point as an intersection of the first line and the third line.

Figure 14:
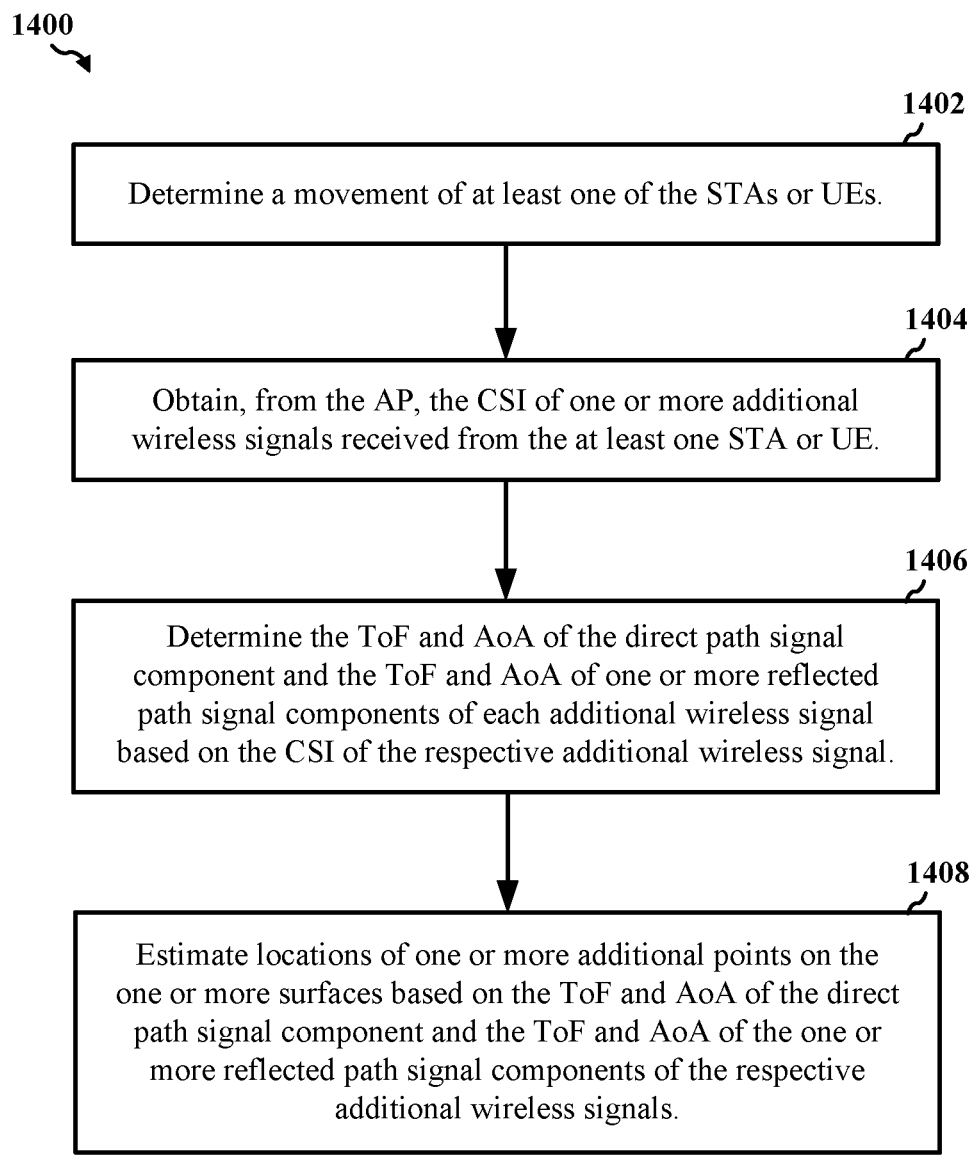
FIG. 14 shows a flowchart illustrating an example operation for estimating locations of additional points in an environment, according to some implementations.

FIG. 14 shows a flowchart illustrating an example operation 1400 for estimating locations of additional points in an environment, according to some implementations. The environment may be any suitable environment, destination, region, location, or venue for which map information is desired. In some instances, the environment may be an indoor environment such as (but not limited to) an airport, shopping mall, office building, arena, museum, and so on. In other instances, the environment may be an outdoor environment such as (but not limited to) a fairground, an amusement park, a stadium, and so on. In various implementations, the operation 1400 may be performed by a system coupled to one or more APs associated with one or more corresponding areas of the environment. In some implementations, the APs may be examples of the AP 102 of FIG. 1, the AP 502 of FIG. 5A, the APs 601-604 of FIG. 6, or the APs of FIGS. 7 and 8. In other implementations, the APs may be other suitable wireless communication devices including (but not limited to) a base station, a STA, or a UE. For the operation 1400, the wireless signals may be received from one or more STAs or UEs within a coverage area of the AP.

In some implementations, the operation 1400 may be performed in conjunction with estimating the locations of the points in block 1006 of FIG. 10. For example, at block 1402, the system determines a movement of at least one of the STAs or UEs. At block 1404, the system obtains the CSI of one or more additional wireless signals received from the at least one STA or UE from the AP. At block 1406, the system determines the ToF and AoA of the direct path signal component and the ToF and AoA of one or more reflected path signal components of each additional wireless signal based on the CSI of the respective additional wireless signal. At block 1408, the system estimates locations of one or more additional points on the one or more surfaces based on the ToF and AoA of the direct path signal component and the ToF and AoA of the one or more reflected path signal components of the respective additional wireless signals.

Figure 15:
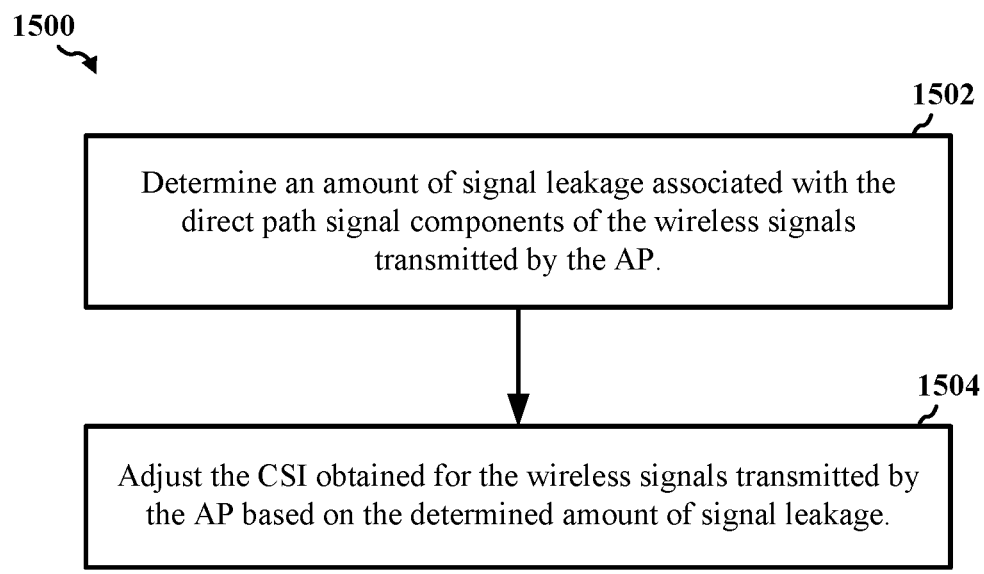
FIG. 15 shows a flowchart illustrating an example operation for adjusting the CSI of monostatic signals, according to some implementations.

FIG. 15 shows a flowchart illustrating an example operation 1500 for adjusting the CSI of received wireless signals, according to some implementations. The environment may be any suitable environment, destination, region, location, or venue for which map information is desired. In some instances, the environment may be an indoor environment such as (but not limited to) an airport, shopping mall, office building, arena, museum, and so on. In other instances, the environment may be an outdoor environment such as (but not limited to) a fairground, an amusement park, a stadium, and so on. In various implementations, the operation 1500 may be performed by a system coupled to one or more APs associated with one or more corresponding areas of the environment. In some implementations, the APs may be examples of the AP 102 of FIG. 1, the AP 502 of FIG. 5A, the APs 601-604 of FIG. 6, or the APs of FIGS. 7 and 8. In other implementations, the APs may be other suitable wireless communication devices including (but not limited to) a base station, a STA, or a UE. For the operation 1500, the wireless signals may be transmitted from the AP.

In some implementations, the operation 1500 may be performed in conjunction with obtaining the CSI of the received wireless signals in block 1002 of FIG. 10. For example, at block 1502, the system determines an amount of signal leakage associated with the direct path signal components of the wireless signals transmitted by the AP. At block 1504, the system adjusts the CSI obtained for the wireless signals transmitted by the AP based on the determined amount of signal leakage.

In some instances, the wireless signals transmitted from and received by the AP may be monostatic signals. The reflected path signal components of a respective monostatic signal may travel away from the AP, reflect from one or more surfaces or points in the area, and arrive at the AP. As such, the reflected path signal components of the respective monostatic signal can be used to estimate or determine the locations of the one or more surfaces or points in the area from which the reflected path signal components of the monostatic signal were reflected. Specifically, the ToF and AoA of each reflected path signal component of the respective monostatic signal can be used to estimate or determine the location of a corresponding surface or point in the environment, for example, in the manner described above with reference to FIGS. 8 and 9.

The direct path signal component of the respective monostatic signal travels directly from the AP's transmit antenna resources to the AP's receive antenna resources. The resulting monostatic signal leakage between the transmit and receive antenna resources of the AP may interfere with the reflected path signal components of the respective monostatic signal and/or may distort channel conditions, which may decrease the accuracy which with the locations of the one or more surfaces or points in the area can be estimated or determined using the CSI of the reflected path signal components. In some implementations, the leakage between transmit and receive antenna resources of the AP can be used to remove or cancel components of the CSI associated with the direct path signal component of the respective monostatic signal. That is, by removing portions of the CSI associated with the direct path signal component of a monostatic signal, the relatively strong direct path signal component of the monostatic signal may not affect (or may have an acceptable effect on) the ToF and AoA estimated or determined for the relatively weak reflected path signal components of the monostatic signal. In this way, the accuracy with which the system can estimate or determine the locations of points or surfaces in the area using the ToF and AoA of the relatively weak reflected path signal components of the monostatic signal may be increased (e.g., as compared to conventional Wi-Fi sensing techniques).

Implementation examples are described in the following numbered clauses:

1. A method of mapping an environment performed by a system, the method including:
   obtaining, from an access point (AP) in an area of the environment, channel state information (CSI) of a plurality of wireless signals;
   determining a time-of-flight (ToF) and an angle-of-arrival (AoA) of one or more reflected path signal components of each wireless signal based on the obtained CSI;
   estimating locations of points on one or more surfaces within the area based on the ToF and AoA of the one or more reflected path signal components of the wireless signals; and
   generating map information for the area of the environment based on the estimated locations of the points on the one or more surfaces.

2. The method of clause 1, where the ToF of the reflected path signal component of a respective wireless signal indicates a distance between the AP and a corresponding point, and the AoA of the reflected path signal component of the respective wireless signal indicates a direction of the corresponding point relative to the AP.

3. The method of any one or more of clauses 1-2, where the ToF and AoA are determined only for the reflected path signal components having a signal-to-noise ratio (SNR), a signal-to-interference-plus-noise ratio (SINR), a received signal strength indicator (RSSI), a reference signal received power (RSRP), or a reference signal received quality (RSRQ) greater than a value.

4. The method of any one or more of clauses 1-3, where the wireless signals are received from one or more wireless stations (STAs) or user equipment (UE) within a coverage area of the AP.

5. The method of clause 4, further including:
   determining a ToF and AoA of a direct path signal component of each wireless signal based on the obtained CSI, where the direct path signal component of a respective wireless signal is the signal component of the respective wireless signal that has the shortest ToF;
   estimating locations of the one or more STAs or UEs based on the ToF and AoA of the direct path signal components of the wireless signals received from the respective STAs or UEs; and
   selectively adjusting the estimated locations of the points on the one or more surfaces based on the estimated locations of the respective STAs or UEs.

6. The method of clause 5, where the wireless signals are transmitted over K tones or frequency subcarriers and are received by N antenna elements of the AP, the ToF and AoA of the direct path signal component of a respective wireless signal is determined concurrently with the ToF and AoA of the one or more reflected path signal components of the respective wireless signal based on a two-dimensional (2D) Fourier transform of the CSI of the respective wireless signal transmitted over the K tones or frequency subcarriers and received by the N antenna elements of the AP, and both K and N are integers greater than 1.

7. The method of any one or more of clauses 5-6, where the ToF and AoA of the direct path signal component and the ToF and AoA of the one or more reflected path signal components of each wireless signal are determined based on a machine learning model trained with the CSI of wireless signals received from one or more transmitter devices having known locations.

8. The method of any one or more of clauses 5-7, where estimating the location of each point includes:
   estimating a location of a respective STA or UE based on a ToF and AoA of the direct path signal component of the wireless signal received from the respective STA or UE;
   determining an image source associated with the point based on the estimated location of the respective STA or UE and the ToF and AoA of a corresponding reflected path signal component of the wireless signal received from the respective STA or UE;
   determining a first line extending between the AP and the image source;
   determining a second line extending between the image source and the estimated location of the respective STA or UE;
   determining a third line that is a perpendicular bisector of the second line; and
   determining the location of the point as an intersection of the first line and the third line.

9. The method of clause 4, further including: determining a movement of at least one of the STAs or UEs;
   obtaining, from the AP, the CSI of one or more additional wireless signals received from the at least one STA or UE;
   determining the ToF and AoA of the direct path signal component and the ToF and AoA of one or more reflected path signal components of each additional wireless signal based on the CSI of the respective additional wireless signal; and
   estimating locations of one or more additional points on the one or more surfaces based on the ToF and AoA of the direct path signal component and the ToF and AoA of the one or more reflected path signal components of the respective additional wireless signals.

10. The method of clause 1, where the wireless signals are monostatic signals transmitted by the AP.

11. The method of clause 10, further including:

determining an amount of signal leakage associated with direct path signal components of the wireless signals transmitted by the AP; and adjusting the CSI obtained for the wireless signals transmitted by the AP based on the determined amount of signal leakage.

12. The method of any one or more of clauses 1-11, where generating the map information includes estimating the locations of the points on the one or more surfaces based on the ToF and AoA of different groups of wireless signals received by the AP at different times.

13. The method of any one or more of clauses 1-12, further including:

determining map information for the environment based on an aggregation of the map information generated for the area of the environment and map information generated for one or more other areas of the environment, where the map information generated for each of the one or more other areas of the environment is based on the CSI of wireless signals received by one or more other respective APs.

14. The method of clause 13, where determining the map information for the environment is further based on locations of the APs associated with each of the areas of the environment, one or more coverage gaps between the areas of the environment, or any combination thereof.

15. The method of any one or more of clauses 1-14, where the system receives the CSI of a respective wireless signal from the AP in response to changes in the CSI of wireless signals received by the AP, changes in the channel frequency responses of wireless signals received by the AP, changes in the channel impulse responses of wireless signals received by the AP, changes in channel conditions of a wireless medium associated with the area, or any combination thereof.

16. The method of any one or more of clauses 1-15, where generating the map information of the area of the environment is further based on the CSI of one or more wireless signals received by another AP associated with the area of the environment.

17. A system, including:

one or more transceivers configured to exchange signals with one or more wireless communication devices;

a memory; and one or more processors communicably coupled to the memory and to the one or more transceivers, the one or more processors configured to:

obtain, from an access point (AP) in an area of an environment, channel state information (CSI) of a plurality of wireless signals;

determine a time-of-flight (ToF) and an angle-of-arrival (AoA) of one or more reflected path signal components of the wireless signals based on the obtained CSI;

estimate locations of points on one or more surfaces within the area based on the ToF and AoA of the one or more reflected path signal components of the wireless signals; and generate map information for the area of the environment based on the estimated locations of the points on the one or more surfaces.

18. The system of clause 17, where the wireless signals are received from one or more wireless stations (STAs) or user equipment (UE) within a coverage area of the AP.

19. The system of clause 18, where the one or more processors are further configured to:

determine a ToF and AoA of a direct path signal component of each wireless signal based on the obtained CSI, where the direct path signal component of a respective wireless signal is the signal component of the respective wireless signal that has the shortest ToF;

estimate locations of the one or more STAs or UEs based on the ToF and AoA of the direct path signal components of the wireless signals received from the respective STAs or UEs; and selectively adjust the estimated locations of the points on the one or more surfaces based on the estimated locations of the respective STAs or UEs.

20. The system of clause 18, where the wireless signals are transmitted over K tones or frequency subcarriers and are received by N antenna elements of the AP, the ToF and AoA of the direct path signal component of a respective wireless signal is determined concurrently with the ToF and AoA of the one or more reflected path signal components of the respective wireless signal based on a two-dimensional (2D) Fourier transform of the CSI of the respective wireless signal transmitted over the K tones or frequency subcarriers and received by the N antenna elements of the AP, and both K and N are integers greater than 1.

21. The system of any one or more of clauses 18-20, where the one or more processors are further configured to:

estimate a location of a respective STA or UE based on a ToF and AoA of the direct path signal component of the wireless signal received from the respective STA or UE;

determine an image source associated with the point based on the estimated location of the respective STA or UE and the ToF and AoA of a corresponding reflected path signal component of the wireless signal received from the respective STA or UE;

determine a first line extending between the AP and the image source;

determine a second line extending between the image source and the estimated location of the respective STA or UE;

determine a third line that is a perpendicular bisector of the second line; and determine the location of the respective point as an intersection of the first line and the third line.

22. The system of clause 17, where the one or more processors are further configured to:

determine a movement of at least one of the STAs or UEs;

obtain, from the AP, the CSI of one or more additional wireless signals received from the at least one STA or UE;

determine the ToF and AoA of the direct path signal component and the ToF and AoA of one or more reflected path signal components of each additional wireless signal based on the CSI of the respective additional wireless signal; and estimate locations of one or more additional points on the one or more surfaces based on the ToF and AoA of the direct path signal component and the ToF and AoA of the one or more reflected path signal components of the respective additional wireless signals.

23. The system of clause 17, where the wireless signals are monostatic signals transmitted by the AP.

24. The system of clause 23, where the one or more processors are further configured to:

determine an amount of signal leakage associated with the direct path signal components of the wireless signals transmitted by the AP; and adjust the CSI obtained for the wireless signals transmitted by the AP based on the determined amount of signal leakage.

25. The method of any one or more of clauses 17-24, where generating the map information includes estimating the locations of the points on the one or more surfaces based on the ToF and AoA of different groups of wireless signals received by the AP at different times.

26. The system of any one or more of clauses 17-25, where the one or more processors are further configured to:

determine map information for the environment based on an aggregation of the map information generated for the area of the environment and map information generated for one or more other areas of the environment, where the map information generated for each of the one or more other areas of the environment is based on the CSI of wireless signals received by one or more other respective APs.

27. A system, including:

means for obtaining, from an access point (AP) in an area of an environment, channel state information (CSI) of a plurality of wireless signals;

means for determining a time-of-flight (ToF) and an angle-of-arrival (AoA) of one or more reflected path signal components of the wireless signals based on the obtained CSI;

means for estimating locations of points on one or more surfaces within the area based on the ToF and AoA of the one or more reflected path signal components of the received wireless signals; and means for generating map information for the area of the environment based on the estimated locations of the points on the one or more surfaces.

28. The system of clause 27, where the wireless signals are received from one or more wireless stations (STAs) or user equipment (UE) within a coverage area of the AP, the system further including:

means for determining a ToF and AoA of a direct path signal component of each wireless signal based on the obtained CSI, where the direct path signal component of a respective wireless signal is the signal component of the respective wireless signal that has the shortest ToF;

means for estimating locations of the one or more STAs or UEs based on the ToF and AoA of the direct path signal components of the wireless signals received from the respective STAs or UEs; and means for selectively adjusting the estimated locations of the points on the one or more surfaces based on the estimated locations of the respective STAs or UEs.

29. The system of clause 27, where the wireless signals are transmitted by the AP, the system further including:

means for determining an amount of signal leakage associated with direct path signal components of the wireless signals; and means for adjusting the obtained CSI based on the determined amount of signal leakage.

30. A non-transitory computer-readable medium storing instructions for generating a map of an environment, where execution of the instructions by one or more processors of a system causes the system to perform operations including:

obtaining, from an access point (AP) in an area of the environment, channel state information (CSI) of a plurality of wireless signals;

determining a time-of-flight (ToF) and an angle-of-arrival (AoA) of one or more reflected path signal components of each received wireless signal based on the obtained CSI;

estimating locations of points on one or more surfaces within the area based on the ToF and AoA of the one or more reflected path signal components of the received wireless signals; and generating map information for the area of the environment based on the estimated locations of the points on the one or more surfaces.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of mapping an environment performed by a system, the method comprising:

obtaining, from an access point (AP) in an area of the environment, channel state information (CSI) of a plurality of wireless signals;

determining a time-of-flight (ToF) and an angle-of-arrival (AoA) of one or more reflected path signal components of each wireless signal based on the obtained CSI;

estimating locations of points on one or more surfaces within the area based on the ToF and AoA of the one or more reflected path signal components of the wireless signals; and generating map information of the area of the environment based on the estimated locations of the points on the one or more surfaces.

2. The method of claim 1, wherein the ToF of the reflected path signal component of a respective wireless signal indicates a distance between the AP and a corresponding point, and the AoA of the reflected path signal component of the respective wireless signal indicates a direction of the corresponding point relative to the AP.

3. The method of claim 1, wherein the ToF and AoA are determined only for the reflected path signal components having a signal-to-noise ratio (SNR), a signal-to-interference-plus-noise ratio (SINR), a received signal strength indicator (RSSI), a reference signal received power (RSRP), or a reference signal received quality (RSRQ) greater than a value.

4. The method of claim 1, further comprising receiving the wireless signals from one or more wireless stations (STAs) or user equipment (UE) within a coverage area of the AP.

5. The method of claim 4, further comprising:
determining a ToF and AoA of a direct path signal component of each wireless signal based on the obtained CSI, wherein the direct path signal component of a respective wireless signal is the signal component of the respective wireless signal that has a shortest ToF;
estimating locations of the one or more STAs or UEs based on the ToF and AoA of the direct path signal components of the wireless signals received from the respective STAs or UEs; and
selectively adjusting the estimated locations of the points on the one or more surfaces based on the estimated locations of the respective STAs or UEs.

6. The method of claim 5, wherein the wireless signals are associated with a transmission over K tones or frequency subcarriers,
wherein receiving the wireless signals includes receiving the wireless signals by N antenna elements of the AP,
wherein determining the ToF and AoA of the direct path signal component of each wireless signal includes determining the ToF and AoA of the direct path signal component of a respective wireless signal concurrently with the ToF and AoA of the one or more reflected path signal components of the respective wireless signal based on a two-dimensional (2D) Fourier transform of the CSI of the respective wireless signal associated with the transmission over the K tones or frequency subcarriers and received by the N antenna elements of the AP, and both K and N are integers greater than 1.

7. The method of claim 5, wherein the ToF and AoA of the direct path signal component and the ToF and AoA of the one or more reflected path signal components of each wireless signal are determined based on a machine learning model trained with CSI of wireless signals received from one or more transmitter devices having known locations.

8. The method of claim 5, wherein estimating the location of each point includes:

estimating a location of a respective STA or UE based on a ToF and AoA of the direct path signal component of the wireless signal received from the respective STA or UE;

determining an image source associated with the point based on the estimated location of the respective STA or UE and the ToF and AoA of a corresponding reflected path signal component of the wireless signal received from the respective STA or UE;

determining a first line extending between the AP and the image source;

determining a second line extending between the image source and the estimated location of the respective STA or UE;

determining a third line that is a perpendicular bisector of the second line; and determining the location of the point as an intersection of the first line and the third line.

9. The method of claim 5, further comprising:
determining a movement of at least one of the STAs or UEs;
obtaining, from the AP, the CSI of one or more additional wireless signals received from at least one STA or UE in the STAs or UEs;
determining the ToF and AoA of the direct path signal component and the ToF and AoA of one or more reflected path signal components of each additional wireless signal based on the CSI of the respective additional wireless signal; and
estimating locations of one or more additional points on the one or more surfaces based on the ToF and AoA of the direct path signal component and the ToF and AoA of the one or more reflected path signal components of the respective additional wireless signals.

10. The method of claim 1, wherein the wireless signals comprise monostatic signals transmitted by the AP.

11. The method of claim 10, further comprising:
determining an amount of signal leakage associated with direct path signal components of the wireless signals; and
adjusting the obtained CSI based on the determined amount of signal leakage.

12. The method of claim 1, wherein generating the map information includes estimating the locations of the points on the one or more surfaces based on the ToF and AoA of different groups of wireless signals received by the AP at different times.

13. The method of claim 1, further comprising:
determining map information for the environment based on an aggregation of the map information generated for the area of the environment and map information generated for one or more other areas of the environment, wherein the map information generated for each of the one or more other areas of the environment is based on the CSI of wireless signals received by one or more other respective APs.

14. The method of claim 13, wherein determining the map information for the environment is further based on locations of the APs associated with each of the areas of the environment, one or more coverage gaps between the areas of the environment, or any combination thereof.

15. The method of claim 1, wherein obtaining the CSI of the plurality of wireless signals includes obtaining the CSI of a respective wireless signal from the AP in response to changes in the CSI of wireless signals received by the AP, changes in channel frequency responses of wireless signals received by the AP, changes in channel impulse responses of wireless signals received by the AP, changes in channel conditions of a wireless medium associated with the area, or any combination thereof.

16. The method of claim 1, wherein generating the map information of the area of the environment is further based on the CSI of one or more wireless signals received by another AP associated with the area of the environment.

17. A system, comprising:
memory; and
one or more processors communicably coupled to the memory, the one or more processors configured to:
obtain, from an access point (AP) in an area of an environment, channel state information (CSI) of a plurality of wireless signals;
determine a time-of-flight (ToF) and an angle-of-arrival (AoA) of one or more reflected path signal components of each wireless signal based on the obtained CSI;
estimate locations of points on one or more surfaces within the area based on the ToF and AoA of the one or more reflected path signal components of the wireless signals; and
generate map information for the area of the environment based on the estimated locations of the points on the one or more surfaces.

18. The system of claim 17, wherein the one or more processors are further configured to receive the wireless signals from one or more wireless stations (STAs) or user equipment (UE) within a coverage area of the AP.

19. The system of claim 18, wherein the one or more processors are further configured to:
determine a ToF and AoA of a direct path signal component of each wireless signal based on the obtained CSI, wherein the direct path signal component of a respective wireless signal is the signal component of the respective wireless signal that has a shortest ToF;
estimate locations of the one or more STAs or UEs based on the ToF and AoA of the direct path signal components of the wireless signals received from the respective STAs or UEs; and
selectively adjust the estimated locations of the points on the one or more surfaces based on the estimated locations of the respective STAs or UEs.

20. The system of claim 19, wherein the wireless signals are associated with a transmission over K tones or frequency subcarriers,
wherein to receive the wireless signals, the one or more processors are configured to receive the wireless signals by N antenna elements of the AP,
wherein to determine the ToF and AoA of the direct path signal component of each wireless signal, the one or more processors are configured to determine the ToF and AoA of the direct path signal component of a respective wireless signal concurrently with the ToF and AoA of the one or more reflected path signal components of the respective wireless signal based on a two-dimensional (2D) Fourier transform of the CSI of the respective wireless signal associated with the transmission over the K tones or frequency subcarriers and received by the N antenna elements of the AP, and both K and N are integers greater than 1.

21. The system of claim 19, wherein the one or more processors are further configured to:
estimate a location of a respective STA or UE based on the ToF and AoA of the direct path signal component of the wireless signal received from the respective STA or UE;
determine an image source associated with the point based on the estimated location of the respective STA or UE and the ToF and AoA of a corresponding reflected path signal component of the wireless signal received from the respective STA or UE;
determine a first line extending between the AP and the image source;
determine a second line extending between the image source and the estimated location of the respective STA or UE;
determine a third line that is a perpendicular bisector of the second line; and
determine the location of the point as an intersection of the first line and the third line.

22. The system of claim 19, wherein the one or more processors are further configured to:
determine a movement of at least one of the STAs or UEs;
obtain, from the AP, the CSI of one or more additional wireless signals received from at least one STA or UE in the STAs or UEs;
determine the ToF and AoA of the direct path signal component and the ToF and AoA of one or more reflected path signal components of each additional wireless signal based on the CSI of the respective additional wireless signal; and
estimate locations of one or more additional points on the one or more surfaces based on the ToF and AoA of the direct path signal component and the ToF and AoA of the one or more reflected path signal components of the respective additional wireless signals.

23. The system of claim 17, wherein the wireless signals are monostatic signals transmitted by the AP.

24. The system of claim 23, wherein the one or more processors are further configured to:
determine an amount of signal leakage associated with direct path signal components of the wireless signals; and
adjust the obtained CSI based on the determined amount of signal leakage.

25. The system of claim 17, wherein to generate the map information, the one or more processors are configured to estimate the locations of the points on the one or more surfaces based on the ToF and AoA of different groups of wireless signals received by the AP at different times.

26. The system of claim 17, wherein the one or more processors are further configured to:
determine map information for the environment based on an aggregation of the map information generated for the area of the environment and map information generated for one or more other areas of the environment, wherein the map information generated for each of the one or more other areas of the environment is based on the CSI of wireless signals received by one or more other respective APs.

27. A system, comprising:
means for obtaining, from an access point (AP) in an area of an environment, channel state information (CSI) of a plurality of wireless signals;
means for determining a time-of-flight (ToF) and an angle-of-arrival (AoA) of one or more reflected path signal components of the wireless signals based on the obtained CSI;
means for estimating locations of points on one or more surfaces within the area based on the ToF and AoA of the one or more reflected path signal components of the wireless signals; and means for generating map information for the area of the environment based on the estimated locations of the points on the one or more surfaces.

28. The system of claim 27, further comprising:

means for receiving the wireless signals from one or more wireless stations (STAs) or user equipment (UE) within a coverage area of the AP;

means for determining a ToF and AoA of a direct path signal component of each wireless signal based on the obtained CSI, wherein the direct path signal component of a respective wireless signal is the signal component of the respective wireless signal that has a shortest ToF;

means for estimating locations of the one or more STAs or UEs based on the ToF and AoA of the direct path signal components of the wireless signals received from the respective STAs or UEs; and means for selectively adjusting the estimated locations of the points on the one or more surfaces based on the estimated locations of the respective STAs or UEs.

29. The system of claim 27, wherein the wireless signals are monostatic signals transmitted by the AP, the system further comprising:

means for determining an amount of signal leakage associated with direct path signal components of the wireless signals; and means for adjusting the obtained CSI based on the determined amount of signal leakage.

30. A non-transitory computer-readable medium storing instructions for generating a map of an environment, wherein execution of the instructions by one or more processors of a system causes the system to perform operations comprising:

obtaining, from an access point (AP) in an area of the environment, channel state information (CSI) of a plurality of wireless signals;

determining a time-of-flight (ToF) and an angle-of-arrival (AoA) of one or more reflected path signal components of each wireless signal based on the obtained CSI;

estimating locations of points on one or more surfaces within the area based on the ToF and AoA of the one or more reflected path signal components of the wireless signals; and generating map information for the area of the environment based on the estimated locations of the points on the one or more surfaces.

* * * * *